US012773836B2

(12) United States Patent
Motegi et al.

(10) Patent No.: US 12,773,836 B2
(45) Date of Patent: Oct. 27, 2026

(54) MASK SHEET, METHOD FOR MANUFACTURING SAME, AND MASK COMPRISING SAME

(71) Applicant: Kao Corporation, Tokyo (JP)

(72) Inventors: Tomoyuki Motegi, Ichikai-machi (JP); Yuta Abe, Utsunomiya (JP); Ryota Shiiba, Utsunomiya (JP); Takehiko Uematsu, Oyama (JP); Hideo Kobayashi, Tokyo (JP); Yoshihiko Kondo, Utsunomiya (JP)

(73) Assignee: KAO CORPORATION, Tokyo (JP)

( * ) Notice: Subject to any disclaimer, the term of this patent is extended or adjusted under 35 U.S.C. 154(b) by 731 days.

(21) Appl. No.: 18/029,115

(22) PCT Filed: Sep. 24, 2021

(86) PCT No.: PCT/JP2021/034925
§ 371 (c)(1),
(2) Date: Mar. 29, 2023

(87) PCT Pub. No.: WO2022/071076
PCT Pub. Date: Apr. 7, 2022

(65) Prior Publication Data

US 2024/0017522 A1 Jan. 18, 2024

(30) Foreign Application Priority Data

Sep. 29, 2020 (JP) ................................ 2020-163837

(51) Int. Cl.
*B32B 5/26* (2006.01)
*A41D 13/11* (2006.01)
(Continued)

(52) U.S. Cl.
CPC ............ *B32B 5/267* (2021.05); *A41D 13/113* (2013.01); *A41D 13/1161* (2013.01);
(Continued)

(58) Field of Classification Search
CPC .. B32B 5/267; B32B 3/28; B32B 3/30; B32B 5/022; B32B 7/02; B32B 7/05;
(Continued)

(56) References Cited

U.S. PATENT DOCUMENTS 4,041,203 A 8/1977 Brock et al.
5,753,343 A * 5/1998 Braun ...................... B32B 5/26
210/493.1

(Continued)

FOREIGN PATENT DOCUMENTS

CN 201657804 U 12/2010
CN 206630030 U 11/2017

(Continued)

OTHER PUBLICATIONS

CN 107072341 (Year: Aug. 2017).*

(Continued)

*Primary Examiner* — Victoria Murphy
(74) *Attorney, Agent, or Firm* — XSENSUS LLP

(57) ABSTRACT

A sheet (10) for a mask has a first fiber layer (11) and a second fiber layer (12). The second fiber layer (12) has a higher trapping ratio for particles having a particle diameter exceeding 1 μm and/or a smaller average fiber diameter than the first fiber layer (11). The basis weight of the second fiber layer (12) is from 1 to 20 g/m$^2$. In a natural state, the second fiber layer (12) has a plurality of projections (13) projecting toward a surface of the second fiber layer (12) that is opposite to a surface of the second fiber layer (12) facing the first fiber layer (11) and depressions (14) that are each arranged between corresponding projections (13) of the plurality of projections (13). The depressions (14) have joined portions (15) where the second fiber layer (12) and the first fiber layer (11) are joined to each other.

7 Claims, 14 Drawing Sheets

(51) Int. Cl.

| | |
|---|---|
| ***A62B 23/02*** | (2006.01) |
| ***B32B 3/28*** | (2006.01) |
| ***B32B 3/30*** | (2006.01) |
| ***B32B 5/02*** | (2006.01) |
| ***B32B 7/02*** | (2019.01) |
| ***B32B 7/05*** | (2019.01) |
| ***B32B 37/20*** | (2006.01) |
| ***D04H 1/4291*** | (2012.01) |
| ***D04H 1/4382*** | (2012.01) |
| ***D04H 1/56*** | (2006.01) |
| ***D04H 1/728*** | (2012.01) |

(52) U.S. Cl.

CPC .............. *A62B 23/025* (2013.01); *B32B 3/28* (2013.01); *B32B 3/30* (2013.01); *B32B 5/022* (2013.01); *B32B 7/02* (2013.01); *B32B 7/05* (2019.01); *B32B 37/20* (2013.01); *D04H 1/4291* (2013.01); *D04H 1/43838* (2020.05); *D04H 1/56* (2013.01); *D04H 1/728* (2013.01); *A41D 2500/30* (2013.01); *B32B 2250/20* (2013.01); *B32B 2262/0253* (2013.01); *B32B 2262/16* (2021.05); *B32B 2305/18* (2013.01); *B32B 2307/51* (2013.01); *B32B 2307/718* (2013.01); *B32B 2307/7242* (2013.01); *B32B 2535/00* (2013.01); *B32B 2571/00* (2013.01); *D10B 2321/022* (2013.01); *D10B 2401/00* (2013.01); *D10B 2401/061* (2013.01); *D10B 2501/042* (2013.01)

(58) Field of Classification Search

CPC ................ B32B 37/20; B32B 2250/20; B32B 2262/0253; B32B 2262/16; B32B 2305/18; B32B 2307/51; B32B 2307/718; B32B 2307/7242; B32B 2535/00; B32B 2571/00; B32B 3/08; B32B 2307/737; B32B 5/06; B32B 5/269; A41D 13/113; A41D 13/1161; A41D 2500/30; A41D 31/145; A41D 13/11; A62B 23/025; D04H 1/4291; D04H 1/43838; D04H 1/56; D04H 1/728; D04H 3/007; D04H 5/08; D04H 3/02; D10B 2321/022; D10B 2401/00; D10B 2401/061; D10B 2501/042; B01D 2239/0622; B01D 2239/0627; B01D 2239/0631; B01D 2239/0677; B01D 2239/0686; B01D 2239/069; B01D 2239/1233; B01D 2239/1291; B01D 39/1623

See application file for complete search history.

(56) References Cited

U.S. PATENT DOCUMENTS

| | | | |
|---|---|---|---|
| 2005/0255297 | A1 | 11/2005 | Otsuka et al. |
| 2021/0120893 | A1 | 4/2021 | Weng |
| 2021/0316238 | A1 | 10/2021 | Ramaratnam et al. |

FOREIGN PATENT DOCUMENTS

| | | | |
|---|---|---|---|
| CN | 206687232 | U | 12/2017 |
| EP | 3597808 | A1 | 1/2020 |
| JP | 54-77598 | U | 6/1979 |
| JP | 2005-314842 | A | 11/2005 |
| JP | 2014-217461 | A | 11/2014 |
| JP | 2015-196263 | A | 11/2015 |
| JP | 2018-149793 | A | 9/2018 |
| JP | 2020-116894 | A | 8/2020 |
| JP | 3227239 | U | 8/2020 |
| WO | 2018/118849 | A1 | 6/2018 |
| WO | 2018/167881 | A1 | 9/2018 |
| WO | 2018/189781 | A1 | 10/2018 |
| WO | 2021/207604 | A1 | 10/2021 |

OTHER PUBLICATIONS

Supplemental Partial European search report issued on Oct. 9, 2024, in corresponding European patent Application No. 21875378.8, 14 pages.

International Search Report and Written Opinion mailed on Nov. 16, 2021, received for PCT Application PCT/JP2021/034925, filed on Sep. 24, 2021, 12 pages including English Translation.

Extended European search report issued on Jan. 20, 2025, in corresponding European patent Application No. 21875378.8, 13 pages.

* cited by examiner

MASK SHEET, METHOD FOR MANUFACTURING SAME, AND MASK COMPRISING SAME

CROSS-REFERENCE TO RELATED APPLICATIONS

The present application is a 371 of PCT filing PCT/JP2021/034925, filed Sep. 24, 2021, and claims priority from Japanese Patent Application No. 2020-163837 filed on Sep. 29, 2020, the entire contents of each are incorporated herein by reference.

TECHNICAL FIELD

The present disclosure relates to a sheet for a mask, a method for producing the sheet, and a mask including the sheet.

BACKGROUND ART

A known example of a mask for covering the mouth and nose of a user is a mask having a mask body formed by a sheet-like material such as a nonwoven fabric. A mask has the effect of preventing the intrusion of dust and dirt, viruses, pollen, and the like from outside the mask. To achieve this effect, Patent Literature 1 discloses a nanofiber laminate material including a porous sheet-like base material, a middle fiber layer, and a nanofiber nonwoven fabric layer formed by electrospinning, laminated in this order. In this nanofiber laminate material, the average fiber diameter of fibers constituting the middle fiber layer is smaller than the average fiber diameter of fibers constituting the sheet-like base material and larger than the average fiber diameter of nanofibers constituting the nanofiber nonwoven fabric layer.

Patent Literature 2 discloses a filter for a respirator, the filter including a corrugated filter member, wherein the corrugated filter member has a plurality of corrugation crest portions and valley patterns that are formed between the corrugation crest portions.

CITATION LIST

Patent Literature

Patent Literature 1: JP 2015-196263A
Patent Literature 2: WO 2018/118849

SUMMARY OF INVENTION

Although the technology disclosed in Patent Literature 1 improves filter performance, the literature makes no mention of air permeability, which is in a tradeoff relationship with filter performance. In the case of the technology disclosed in Patent Literature 2, a flexible frame to which the corrugated filter is attached and fixed is needed, and thus, the resulting mask looks like a so-called industrial mask. In addition, the air permeability of the mask as a whole is questionable, because the mask is constituted by non-air-permeable members, except for the filter portion. As described above, it is not easy with conventional technologies to improve particle trapping performance while keeping ventilation resistance at a low level. Therefore, the present invention relates to providing a sheet for a mask, the sheet achieving both high particle trapping performance and low ventilation resistance.

The present invention relates to a sheet for a mask, having: a first surface and a second surface; and the sheet including: a first fiber layer and a second fiber layer disposed on one surface side of the first fiber layer.

It is preferable that the first surface is located on a side of the second fiber layer that is opposite to a surface of the second fiber layer facing the first fiber layer, and the second surface is located on a side of the first fiber layer that is opposite to a surface of the first fiber layer facing the second fiber layer.

It is preferable that the second fiber layer has a higher trapping ratio for particles having a particle diameter of exceeding 1 μm than the first fiber layer, and/or a smaller average fiber diameter than the first fiber layer.

It is preferable that a basis weight of the second fiber layer is from 1 to 20 g/m$^2$.

It is preferable that, in a natural state, the second fiber layer has a plurality of projections projecting toward a surface of the second fiber layer that is opposite to the surface of the second fiber layer facing the first fiber layer and depressions that are each arranged between corresponding projections of the plurality of projections.

It is preferable that the depressions have joined portions where the second fiber layer and the first fiber layer are joined to each other.

Also, the present invention relates to a sheet for a mask, wherein a trapping ratio H for particles having a particle diameter exceeding 1 μm of the entire sheet for a mask is from 85% to 100%.

It is preferable that, in the sheet for a mask of the present invention, the trapping ratio H and a ventilation resistance R, of the entire sheet for a mask satisfy a formula (1) below:

$$R \leq 0.02H - 1.55 \quad (1).$$

It is preferable that, in the sheet for a mask of the present invention, the ventilation resistance R of the entire sheet for a mask is greater than 0 kPa·s/m and 0.25 kPa·s/m or less.

Also, the present invention relates to a mask including a mask body and a filter sheet that can be removably attached to the mask body, wherein the filter sheet includes the above-described sheet for a mask.

Also, the present invention relates to use of a sheet for a mask, wherein the above-described sheet for a mask is used as a filter sheet that can be removably attached to a mask body of a mask.

Also, as a preferred method for producing the above-described sheet for a mask, the present invention relates to a method for producing a sheet for a mask, the method including:

- a step of superposing, in a state in which a first fiber sheet having elasticity is stretched, a second fiber sheet on one surface side of the first fiber sheet.

It is preferable that this production method includes a step of partially joining the two sheets to each other.

It is preferable that, in this production method, a fiber sheet having a smaller average fiber diameter than the first fiber sheet is used as the second fiber sheet.

Furthermore, as another preferred method for producing the above-described sheet for a mask, the present invention relates to a method for producing a sheet for a mask, the method including:

- a step of imparting a projecting-and-depressed shape to a second fiber sheet; and
- a step of superposing a first fiber sheet on one surface side of the second fiber sheet to which the projecting-and-depressed shape has been imparted.

It is preferable that this production method includes a step of joining depressions of the second fiber sheet to the first fiber sheet.

It is preferable that, in this production method, a fiber sheet having a smaller average fiber diameter than the first fiber sheet is used as the second fiber sheet.

Other features of the present invention will become apparent from the claims and the following description.

DESCRIPTION OF EMBODIMENTS

Figure 1:
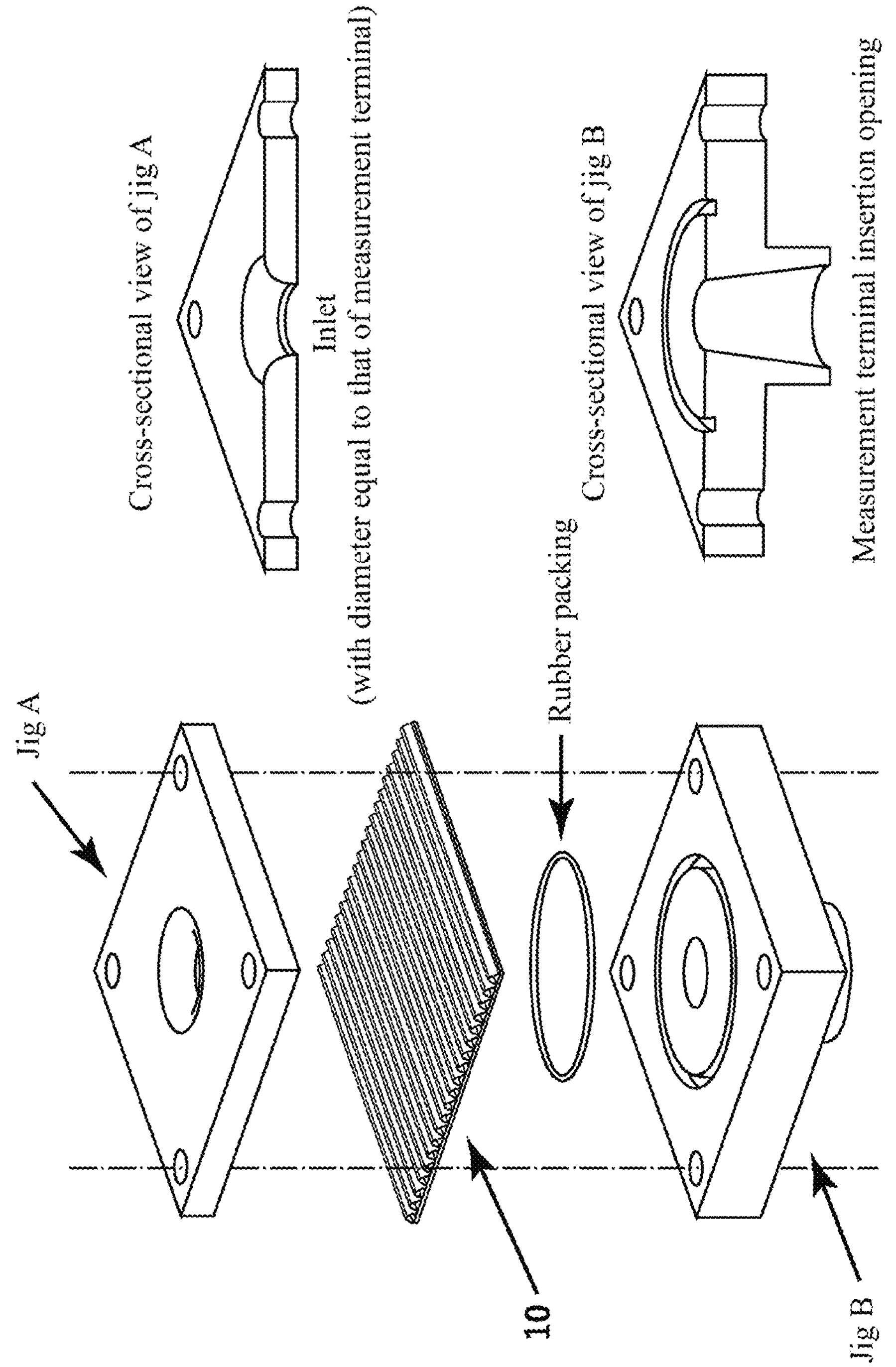
FIG. 1 is an exploded perspective view showing an apparatus for measuring a particle trapping ratio.

In this specification, in the case where an upper limit value or a lower limit value, or upper and lower limit values of a numerical value are specified, the upper limit value and the lower limit value themselves are also included. Moreover, even if not explicitly stated, it should be construed that all numerical values, or numerical value ranges, equal to or smaller than the upper limit value of a numerical value or equal to or greater than the lower limit value thereof, or within the range between the upper and lower limit values thereof are described.

As used herein, "a", "an", and the like should be construed as "one or more". In view of the foregoing and following disclosure herein, it will be understood that various modifications and alterations can be made to the present invention. Accordingly, it should be appreciated that the present invention can also be implemented in embodiments that are not clearly stated in this specification, without departing from the technical scope as defined in the claims.

The entire contents of each piece of patent literature mentioned above are incorporated by reference in this specification as a part of the contents thereof.

This application is based upon and claims the benefit of priority from Japanese Patent Application No. 2020-163837 filed on Sep. 29, 2020, the entire contents of which are incorporated by reference in this specification as a part thereof.

Hereinafter, the present invention will be described based on preferred embodiments thereof. The present invention relates to a sheet material used for a mask. As used herein, the term "mask" refers to a member that is to be worn on the face of a person for breathing and that filters air before being inhaled into the respiratory system of the person. Therefore, a sheet for a mask is preferably sized and shaped to sufficiently cover the mouth and nose of a person.

A sheet for a mask of the present invention has a first surface and a second surface that is located opposite to the first surface. The sheet for a mask of the present invention is made of a fiber material. In other words, the sheet for a mask of the present invention is a fiber sheet. The air filtering effect of the sheet for a mask of the present invention is realized by blocking the passage of foreign matter in air when the air passes through a space defined by fibers constituting the sheet.

In order to effectively prevent inhalation of viruses, pollen, microparticles, and the like, it is preferable that the entire sheet for a mask of the present invention exhibits a high trapping ratio H of 85% or greater for particles having a particle diameter exceeding 1 μm, for example. More specifically, the inventors of the present invention conducted in-depth research and found that, with a trapping ratio H of 85% or greater, the VFE (Viral Filtration Efficiency) and the BFE (Bacterial Filtration Efficiency) as measured in conformity with the ASTM F 2101 standard and the PFE (Particle Filtration Efficiency) as measured in conformity with the ASTM F 2299 standard are each 99% or greater.

In particular, the trapping ratio H of the entire sheet for a mask is more preferably 88% or greater, even more preferably 90% or greater, and yet even more preferably 92% or greater. A trapping ratio H that is not less than this lower limit value is preferable because the inhalation of viruses, pollen, microparticles, and the like can be even more effectively prevented. The higher the value of the trapping ratio H of the entire sheet for a mask, the higher the trapping performance, and the trapping ratio H is preferably 100% or less.

In this specification, the trapping ratio H for particles exceeding 1 μm is measured in the following manner.

A handheld air particle counter ("MET ONE HHPC6+" manufactured by Beckman Coulter, Inc.) is used. A sheet to be evaluated is fixed so as to cover a measurement terminal of the counter. At this time, the sheet needs to cover the measurement terminal while being in close contact with the measurement terminal so that air does not leak from a gap between the measurement terminal and the sheet, and measurement is performed using a dedicated jig such as that shown in FIG. 1. The jig shown in FIG. 1 has a jig A and a jig B. Rubber packing is set between the jig A and the jig B, and the sheet to be measured is set between the rubber packing and the jig A. Using this jig, the number P1 of particles passing through the sheet is measured for particles (with a particle diameter of 1.0 μm or less) in air at 25° C. and 50% RH. Separately, the number P2 of particles is measured in a state in which the sheet is not set. From the measured numbers P1 and P2 of particles, the microparticle trapping ratio H (%) is calculated based on the formula below. The higher the value of the microparticle trapping ratio, the higher the microparticle trapping performance of the sheet for a mask. The size of the sheet used for the measurement is 40 mm×40 mm. The trapping ratio is measured for ten sheets, and an average value of the measured values is used as the trapping ratio H.

$$\text{Microparticle trapping ratio } H(\%)=100\times(P2-P1)/P2$$

In the case where the sheet for a mask has a laminated structure constituted by a plurality of layers as described later, to measure the trapping ratio of each fiber layer, the sheet can be delaminated into the individual constituent fiber layers, and the trapping ratio of each fiber layer can be measured. Depending on the state in which the fiber layers are joined to each other, there may be cases where delamination cannot be successfully performed. For example, in the case where a first fiber layer and a second fiber layer are fusion bonded to each other in an embodiment shown in FIGS. 2 and 3, which will be described later, during the delamination, the second fiber layer having low strength is pulled by the first fiber layer having high strength, at joined portions, and thus, holes may be formed in the second fiber layer. In such a case, the trapping ratio H1(%) of the separated first fiber layer and the trapping ratio H (%) of the combined fiber layers before separation are measured, and the trapping ratio H2 of the second fiber layer is calculated based on the formula below.

$$H2(\%)=\{1-(100-H)/(100-H1)\}\times100$$

In the case where the first fiber layer and the second fiber layer are bonded to each other using a hot-melt adhesive or the like, the fiber layers are separated after making the hot-melt adhesive brittle using a commercially available cooling spray. Note that, in the case where a sheet 10 for a mask has a third fiber layer 33 (see FIG. 15), which will be described later, the same applies to the separation between the second fiber layer and the third fiber layer. Furthermore, in the cases where the sheet 10 for a mask has a fourth fiber layer 43 (see FIGS. 16 and 17), which will be described later, the same applies to the separation between the third fiber layer and the fourth fiber layer and the separation between the first fiber layer and the fourth fiber layer.

This separation method is common to the other measurement methods described in this specification.

In order to increase the microparticle trapping ratio H, it is advantageous to reduce the thickness of the fibers constituting the sheet for a mask or shorten the interfiber distance. However, reducing the fiber thickness or shortening the interfiber distance means an increase in the resistance to air as it passes through the sheet. This prevents a user of the mask from breathing smoothly, and also causes heat and moisture accumulation.

To address this issue, it is preferable to set the ventilation resistance R of the entire sheet for a mask to the lowest possible value while keeping the above-described microparticle trapping ratio H at a high level. In view of this, the ventilation resistance R of the entire sheet for a mask is preferably 0.25 kPa·s/m or less, and is more preferably 0.2 kPa·s/m or less, or even more preferably 0.18 kPa·s/m or less, in order to enable even smoother breathing. The lower the value of the ventilation resistance R, the smoother the breathing, and the less likely heat and moisture are to accumulate.

Practically, the ventilation resistance R of the entire sheet for a mask is greater than 0 kPa·s/m.

It is preferable that the sheet for a mask of the present invention satisfies the formula (1) below in addition to or instead of satisfying the above-described relationship between the trapping ratio H for particles exceeding 1 μm and the ventilation resistance R, of the entire sheet for a mask. As a result of the trapping ratio H and the ventilation resistance R of the entire sheet for a mask satisfying the formula (1) as well (see FIG. 19), the sheet for a mask of the present invention achieves both high particle trapping performance and low ventilation resistance.

$$R\leq0.02H-1.55 \qquad (1)$$

It is preferable that the formula (1) above is satisfied, especially when the ventilation resistance R is within the range of 0.25 to 0.45 kPa·s/m, because in this case the particle trapping performance is further enhanced and the ventilation resistance R is further reduced.

The ventilation resistance R is measured using an air permeability tester ("KES-F8-AP1" manufactured by Kato Tech Co., Ltd.). A sheet to be measured is fixed so as to cover a vent of the air permeability tester, and the ventilation resistance R (kPa·s/m) when air passes through the sheet at 25° C. and 50% RH is measured.

Some known sheets for a mask have a high particle trapping ratio, but such sheets have high ventilation resistance. Conversely, conventional sheets for a mask that have low ventilation resistance do not have a high particle trapping ratio. As such, known sheets for a mask do not achieve both a high particle trapping ratio and low ventilation resistance. In contrast, the sheet for a mask of the present invention is completely different from known sheets for a mask in that it achieves both a high particle trapping ratio H and a low ventilation resistance R as is clear from the results shown in FIG. 19, which will be described later. The area of the vent used to measure the ventilation resistance R is 2π (cm$^2$, and the ventilation rate is 4 cc/(cm$^2$·s) (at a piston speed of 2 cm/s). The size of the sheet used for the measurement is 40 mm×40 mm. The ventilation resistance value is measured for a total of ten sheets, and an average value of the measured values is used as the ventilation resistance R.

Note that the measurement of the trapping ratio H and the measurement of the ventilation resistance R need to be performed at the same measurement position. That is to say, the approximate center of a measured portion of each sheet of the ten sheets for which the trapping ratio H is measured and the approximate center of a measured portion of that sheet of the ten sheets for which the ventilation resistance R is measured need to coincide with each other. Furthermore, in both the measurement of the trapping ratio H and the measurement of the ventilation resistance R, when a sheet to be measured is brought into close contact with a measuring portion, the sheet may be deformed. Therefore, for the purpose of eliminating the influence of deformation of the sheet on the measurement, it is preferable to measure the ventilation resistance R, where the area of the measured portion is large, before measuring the trapping ratio H.

The inventors of the present invention conducted in-depth research with the view of achieving both a high particle trapping ratio H and a low ventilation resistance R, and found that it is effective to increase the effective area through which air passes, in the sheet for a mask. This is described in greater detail below. The phenomenon of a person breathing through a mask is a phenomenon in which expansion and contraction of the lungs and the like create a difference in air pressure between inside and outside the mask, and this pressure difference causes air to flow through the mask. In general, a mask with a filter having a higher trapping ratio H has higher resistance to the air flow, and thus a greater pressure difference needs to be created in order to secure an amount of air that is needed for breathing. This makes breathing harder. Here, if the pressure difference is the same and the effective area of the filter is doubled, the air flow rate per unit area of the filter remains the same, but the overall air flow rate doubles. In other words, even with a filter having high trapping performance, if the effective area thereof is increased, a sufficient air flow rate can be generated by a small pressure difference. Accordingly, it can be derived from this principle that both a high trapping ratio H and a low ventilation resistance R can be achieved. The inventors of the present invention conducted further research in view of this, and found that it is effective to make the sheet, which is two-dimensional, for a mask shaped so as to have projections and depressions in a thickness direction thereof. By imparting this projecting-and-depressed shape to the sheet for a mask, the sheet has a larger surface area than the area of the sheet in its natural state in a planar projection view.

The sheet 10 for a mask of an embodiment of the present invention is made to have a projecting-and-depressed shape that has projections and depressions in the thickness direction. The sheet 10 for a mask has a two-layer structure including a first fiber layer 11 and a second fiber layer 12.

The second fiber layer 12 is disposed on one surface side of the first fiber layer 11 and is typically in contact with the first fiber layer 11. That is to say, there are no other layers between the first fiber layer 11 and the second fiber layer 12. This embodiment is shown in FIGS. 2 and 3.

However, this does not preclude the presence of another layer between the first fiber layer 11 and the second fiber layer 12, and, depending on the specific use or the like of the sheet 10 for a mask of the present invention, another layer may be present between the first fiber layer 11 and the second fiber layer 12.

It is preferable that a first surface I of the sheet 10 for a mask of the present invention is located on a side of the second fiber layer 12 that is opposite to a surface of the second fiber layer 12 facing the first fiber layer 11. In addition, it is preferable that a second surface II of the sheet 10 for a mask of the present invention is located on a side of the first fiber layer 11 that is opposite to a surface of the first fiber layer 11 facing the second fiber layer 12.

Figure 2:
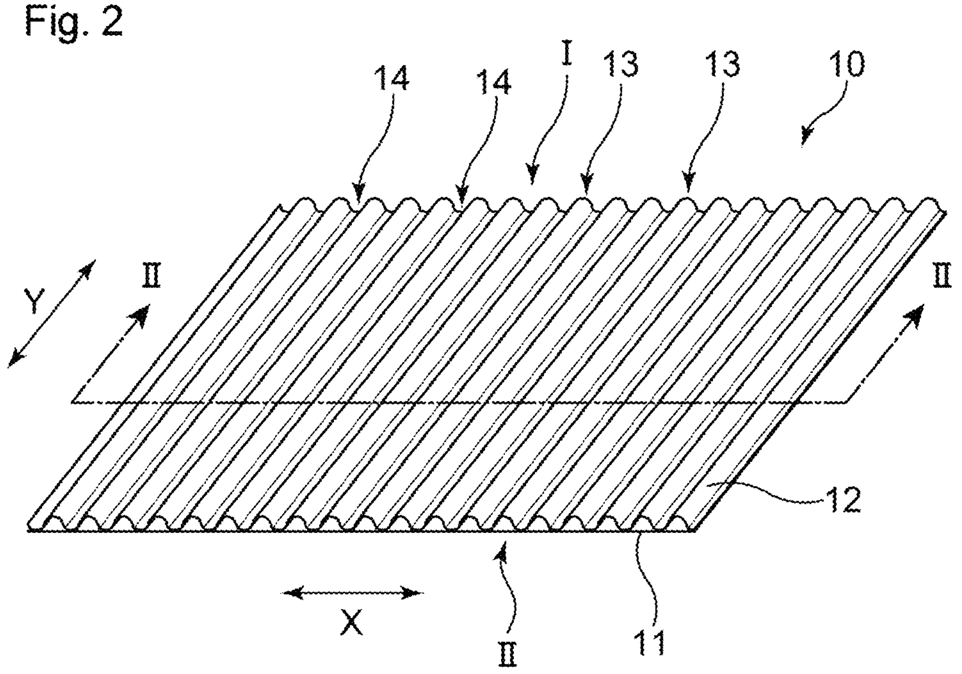
FIG. 2 is a perspective view showing an embodiment of a sheet for a mask of the present invention.
Figure 3:
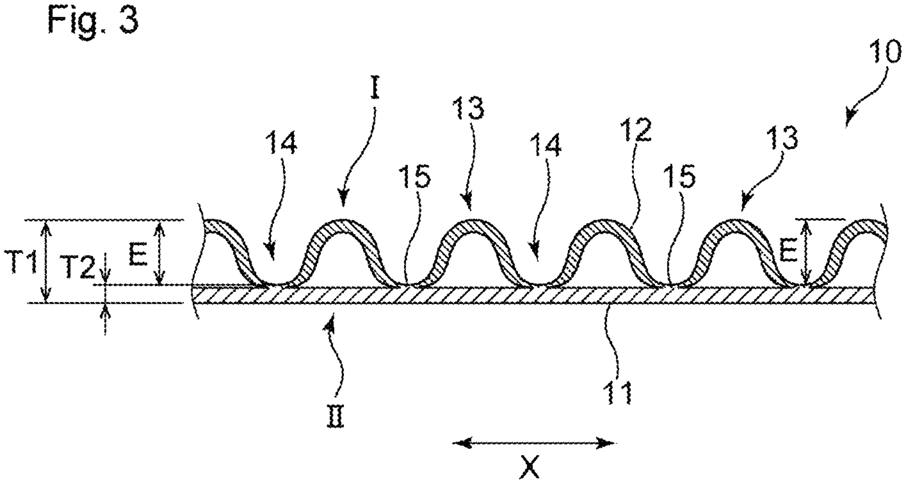
FIG. 3 is a cross-sectional view of the sheet for a mask shown in FIG. 2, taken along line II-II.

In the embodiment shown in FIGS. 2 and 3, an outer surface of the first fiber layer 11 and an outer surface of the second fiber layer 12 serve as outer surfaces of the sheet 10 for a mask. The first surface I of the sheet 10 for a mask is the outer surface of the second fiber layer 12. The second surface II of the sheet 10 for a mask is the outer surface of the first fiber layer 11.

Both the first fiber layer 11 and the second fiber layer 12 are made of fibers. The first fiber layer 11 keeps its shape as a layer as a result of the fibers constituting the layer being entangled or bonded or entangled and bonded. The same holds true for the second fiber layer 12.

In the sheet 10 for a mask, the first fiber layer 11 and the second fiber layer 12 have different functions. More specifically, the first fiber layer 11 mainly has the function of a support in the sheet 10 for a mask. On the other hand, the second fiber layer 12 mainly has the function of a filter medium in the sheet 10 for a mask.

In general, to reduce the ventilation resistance, it is desirable that the second fiber layer 12, which has the function of a filter medium, has a low basis weight. However, with the second fiber layer 12 alone, it is not easy for the sheet 10 for a mask to exhibit sufficient sheet strength to withstand actual use. On the other hand, when attempting to form a sheet 10 for a mask consisting only of the second fiber layer 12, the basis weight of the second fiber layer 12 needs to be increased in order for the sheet 10 for a mask to exhibit sufficient sheet strength to withstand actual use. In that case, however, it becomes difficult to ensure a certain level of air permeability that allows the user of the 10 sheet for a mask to breathe easily, and the feel of the sheet for a mask during use tends to be degraded.

In order to address both of these conflicting issues, in an embodiment of the present invention, the first fiber layer 11, which has the function of a support, is used in addition to the second fiber layer 12, to thereby impart sufficient strength to the sheet 10 for a mask while improving the particle trapping performance thereof and achieving appropriate air permeability. In addition, the second fiber layer 12 having the projecting-and-depressed shape is joined to the first fiber layer 11, and thus, a structure is achieved in which the projecting-and-depressed shape can be constantly maintained. Therefore, when in use, the sheet 10 for a mask can reduce heat and moisture accumulation during use and allow for easy breathing while sufficiently trapping particles. Furthermore, when the sheet 10 for a mask is formed into a mask and worn on the face, only the projections thereof mainly come into contact with the skin, and therefore, rubbing against the skin can be significantly reduced. As a result, the feel of the sheet for a mask, and the mask including the sheet, during use can be improved.

Since the second fiber layer 12 has the function of a filter medium, the first fiber layer 11 and the second fiber layer 12 are distinguished from each other on the basis of the particle trapping ratio and/or the average fiber diameter.

With regard to the particle trapping ratio, the second fiber layer 12 has a higher trapping ratio for particles having a particle diameter exceeding 1 μm than the first fiber layer 11. When the trapping ratio of the first fiber layer 11 is C1(%), and the trapping ratio of the second fiber layer 12 is C2(%), the trapping ratio C of the sheet 10 for a mask is calculated based on the formula below.

$$C(\%)=\{1-(1-C1/100)\times(1-C2/100)\}\times 100$$

The value of C1 is preferably 50% or less, and the value of C2 is preferably 70% or greater. In other words, it is preferable that the trapping ratios of the two layers differ to such an extent that the value of C1/C2 is preferably from 0 to 0.7, because the functions of the first fiber layer 11 and the second fiber layer 12 can then be clearly distinguished from each other.

The value of C is preferably 85% or greater, more preferably 88% or greater, and even more preferably 90% or greater and is preferably 100% or less. The method for measuring the particle trapping ratio is as described above.

On the other hand, with regard to the average fiber diameter, the average fiber diameter of fibers constituting the second fiber layer 12 is smaller than the average fiber diameter of fibers constituting the first fiber layer 11. This allows the second fiber layer 12 to effectively function as a filter medium. In this case, when the average fiber diameter of fibers constituting the first fiber layer 11 is D1, and the average fiber diameter of fibers constituting the second fiber layer 12 is D2, D1 is preferably 5 μm or greater, and D2 is preferably 3 μm or less. In other words, it is preferable that the average fiber diameters of the two layers differ to such an extent that the value of D1/D2 is preferably 1.6 or greater, because the functions of the first fiber layer 11 and the second fiber layer 12 can then be clearly distinguished from each other. The value of D1/D2 is more preferably 25 or greater.

Practically, the value of D1/D2 is 50 or less.

While a preferred value of D1/D2 is as described above, the average fiber diameter D2 of fibers constituting the second fiber layer 12 of the sheet 10 for a mask is preferably 0.2 μm or greater, more preferably 0.3 μm or greater, and even more preferably 0.4 μm or greater, in order to ensure appropriate air permeability and allow the user of the sheet 10 for a mask to breathe easily.

The average fiber diameter D2 is preferably 3 μm or less as described above, more preferably 2 μm or less, and even more preferably 1 μm or less, in order to enhance the particle trapping performance.

In addition, on the condition that the average fiber diameter D1 of fibers constituting the first fiber layer 11 of the sheet 10 for a mask is larger than the average fiber diameter D2 of fibers constituting the second fiber layer 12, the average fiber diameter D1 is preferably 5 μm or greater as described above, more preferably 8 μm or greater, and even more preferably 10 μm or greater, in order for the first fiber layer 11 to exhibit sufficient strength to thereby allow the sheet 10 for a mask to exhibit sufficient strength to withstand actual use.

The average fiber diameter D1 is preferably 30 μm or less, more preferably 25 μm or less, and even more preferably 20 μm or less, in order to achieve both an improved feel of the sheet 10 for a mask during use and sufficient strength of the sheet to withstand actual use.

The average fiber diameters of fibers constituting the first fiber layer 11 and the second fiber layer 12 are measured in the following manner.

The average fiber diameters D1 and D2 of fibers constituting the first fiber layer 11 and the second fiber layer 12 can be measured by measuring the maximum length across a fiber cross section perpendicular to a fiber length direction using a scanning electron microscope (SEM). Specific procedures are as follows.

After carefully separating the sheet for a mask into constituent layers and confirming how many layers the sheet has, the layer with the smallest fiber diameter (layer that functions as a filter medium) is defined as the second fiber layer 12. Also, the layer with the largest fiber diameter is defined as the first fiber layer 11. From a two-dimensional image obtained through observation under an SEM, 500 fibers excluding defects such as fiber clusters, fiber intersections, and polymer droplets are randomly selected, and for each fiber, the length of a line that is drawn perpendicular to the longitudinal direction of the fiber is directly read as the fiber diameter. From a frequency distribution (histogram) of the thus measured fiber diameters, the median fiber diameter for which the cumulative frequency is 50% of the total is obtained, and this median fiber diameter is defined as the average fiber diameter of fibers constituting each fiber layer.

In general, the filtering performance of a fiber sheet depends not only on the thickness of fibers constituting the fiber sheet but also on the basis weight of the fiber sheet.

In order to guarantee the filtering performance, uniformize the basis weight, and uniformize the filtering performance, the basis weight M2 of the second fiber layer 12 is preferably 1 g/m$^2$ or greater, more preferably 2 g/m$^2$ or greater, even more preferably 2.5 g/m$^2$ or greater, and yet even more preferably 3 g/m$^2$ or greater.

Also, in order to reduce the ventilation resistance and reduce the thickness of the sheet to improve the feel of the sheet during use and also reduce the cost, the basis weight M2 of the second fiber layer 12 is preferably 20 g/m$^2$ or less, more preferably 15 g/m$^2$ or less, even more preferably 10 g/m$^2$ or less, and yet even more preferably 5 g/m$^2$ or less.

The basis weight M2 of the second fiber layer 12 is preferably from 1 to 20 g/m$^2$, more preferably from 2 to 15 g/m$^2$, even more preferably from 2.5 to 10 g/m$^2$, and yet even more preferably from 3 to 5 g/m$^2$.

When the basis weight M2 is in such a range, the sheet 10 for a mask can stably exhibit high microparticle trapping performance, have favorable air permeability, and can also achieve an improvement in the feel of the sheet during use resulting from a reduction in the thickness of the sheet.

On the other hand, the basis weight M1 of the first fiber layer 11 is preferably 5 g/m$^2$ or greater, more preferably 10 g/m$^2$ or greater, and even more preferably 15 g/m$^2$ or greater. With the basis weight M1 in such a range, the first fiber layer 11 can impart sufficient strength to the sheet 10 for a mask.

Also, the basis weight M1 of the first fiber layer 11 is preferably 55 g/m$^2$ or less, more preferably 50 g/m$^2$ or less, and even more preferably 45 g/m$^2$ or less. With the basis weight M1 in such a range, the ventilation resistance of the first fiber layer 11 can be reduced to a low level.

Note that, when a composite sheet such as that used in Example 4 is used as the first fiber layer, the basis weight M1 here refers to the basis weight of the entire composite sheet.

Although the first fiber layer 11, which has the function of a support, has a lower ventilation resistance than the second fiber layer 12, which has the function of a filter medium, reducing the ventilation resistance of the first fiber layer 11 is advantageous in that appropriate air permeability of the sheet 10 for a mask can be ensured, and thus, heat and moisture accumulation during use can be reduced and easier breathing can be enabled. As a result, the feel of the sheet 10 for a mask during use can be further improved.

It is preferable that the basis weight of the first fiber layer 11 and the basis weight of the second fiber layer 12 have a relationship in which the ratio (M1/M2) of the basis weight M1 of the first fiber layer 11 to the basis weight M2 of the second fiber layer 12 is within a predetermined range.

More specifically, in order to realize sufficient strength to withstand actual use, the ratio (M1/M2) of the basis weight M1 of the first fiber layer 11 to the basis weight M2 of the second fiber layer 12 is preferably greater than 0, more preferably 0.25 or greater, and even more preferably 0.5 or greater.

Also, in order to further improve the feel of the sheet 10 for a mask during use, M1/M2 is preferably less than 20, more preferably 17.5 or less, and even more preferably 15 or less.

By setting the value of M1/M2 within this range, it is possible to reduce the thickness of the sheet 10 for a mask and thereby improve the handleability of the sheet 10 for a mask. As a result, the feel of the sheet 10 for a mask during use can be further improved.

To obtain the basis weight M1 of the first fiber layer 11 and the basis weight M2 of the second fiber layer 12, after specifying the presence of individual fiber layers and separating the fiber layers in the above-described manner, a 20 mm square is cut from each of the separated fiber layers, the mass (g) of the cut sheet is measured, and the basis weight is calculated by dividing the mass by the area (400 mm 2=0.000 4 m 2) of the cut sheet.

Typically, each surface of the first fiber layer 11 is substantially flat.

In contrast to the first fiber layer 11, typically, each surface of the second fiber layer 12 has a projecting-and-depressed structure. More specifically, the second fiber layer 12 has a plurality of projections 13 projecting toward the surface of the second fiber layer 12 that is opposite to the surface of the second fiber layer 12 facing the first fiber layer 11 and a plurality of depressions 14 that are each arranged between corresponding projections 13 of the plurality of projections 13.

It is preferable that the depressions 14 have joined portions 15 where the first fiber layer 11 and the second fiber layer 12 are joined to each other.

It is preferable that the sheet 10 for a mask exhibits this projecting-and-depressed structure when the sheet 10 for a mask is in a natural state. This embodiment is shown in FIGS. 2 and 3.

The "natural state" refers to a state in which no external force is applied to the sheet 10 for a mask.

It is preferable that, at each projection 13, the first fiber layer 11 and the second fiber layer 12 are spaced apart from each other. As a result, a space defined by the first fiber layer 11 and the second fiber layer 12 is formed inside each projection 13. That is to say, it is preferable that the projections 13 are hollow inside. The projections 13 that are hollow inside have the advantage that, when an external force is applied to the sheet 10 for a mask in the thickness direction thereof, the projections 13 exhibit a buffering effect on the external force and impart a great cushioning feel. In addition, the projections 13 that are hollow inside also have the advantage that, when a lateral external force is applied to the projections, the projections can easily deform in a flexible manner, thereby reducing rubbing against the skin. These advantages are more marked when the second fiber layer 12 side of the sheet 10 for a mask is used as a skin-facing surface. Moreover, the projections 13 that are hollow inside also have the advantage of effectively suppressing an increase in ventilation resistance, when compared with the case where the projections 13 are solid inside.

Typically, the projections 13 each extend continuously in one direction. In the example shown in FIG. 2, the one direction is a direction Y.

Typically, the depressions 14 also each extend continuously in the same direction as the extending direction of the projections 13. The projections 13 and the depressions 14 are alternately located in a direction X that is perpendicular to the direction Y.

Accordingly, typically, the second fiber layer 12 has ridges constituted by the projections 13 and grooves constituted by the depressions 14, and the ridges and grooves extend continuously in the same direction to form a ridge-groove structure.

Thus, typically, a surface (i.e., the second surface II) on the first fiber layer 11 side of the sheet 10 for a mask is a flat surface, and a surface (i.e., the first surface I) on the second fiber layer 12 side is a projecting-and-depressed surface.

The first fiber layer 11 and the second fiber layer 12 are typically joined to each other at joined portions 15.

It is preferable that the joined portions 15 are located in the depressions 14.

Figure 4:
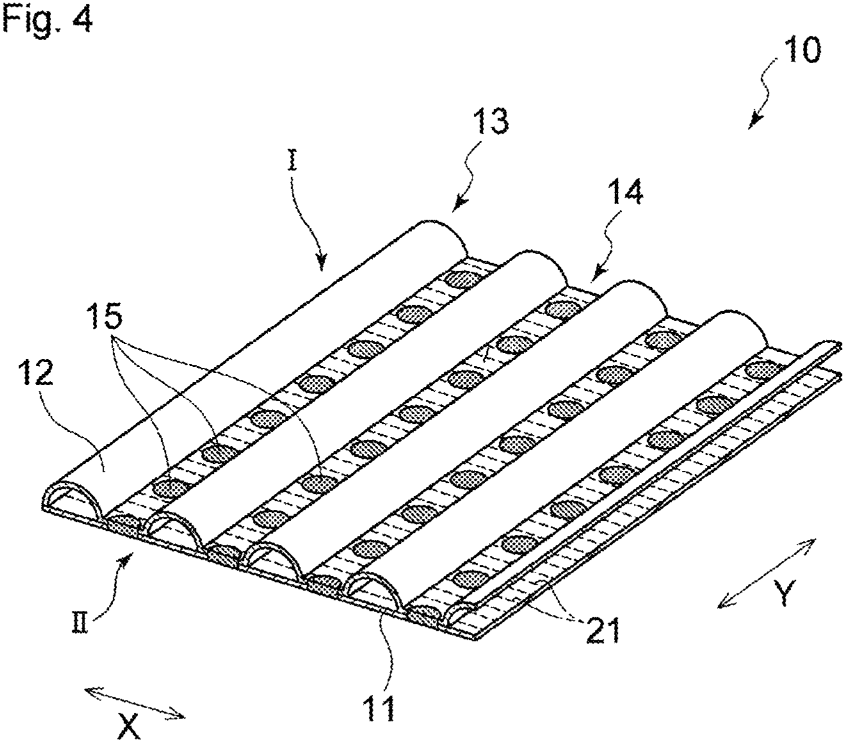
FIG. 4 is an enlarged perspective view of a portion of the sheet for a mask shown in FIG. 2.

It is preferable that a plurality of joined portions 15 are intermittently formed in each depression 14 along the extending direction of the depression 14 and constitute a joined portion row. This embodiment is shown in FIG. 4.

Typically, the joined portions 15 have a circular shape. However, the shape of the joined portions 15 is not limited to this and may be a shape other than a circular shape, examples of which include polygons such as a triangle, a quadrilateral, and a hexagon, as well as other shapes.

In addition, the joined portions 15 may form a continuous joined portion along the extending direction of the depressions 14.

However, in order not to impair the texture and tactile feel of the first fiber layer 11 and the second fiber layer 12, it is advantageous to form the joined portions 15 intermittently. Moreover, in order to effectively suppress an increase in the ventilation resistance of the sheet 10 for a mask as well, it is advantageous to from the joined portions 15 intermittently.

The joined portions 15 can be formed by, for example, fusing the first fiber layer 11 and the second fiber layer 12 together, or bonding the two fiber layers to each other.

When focusing on a single joined portion row, the distance between adjacent joined portions 15 in the extending direction of the depression 14 may be fixed or may vary. Also, when focusing on a single joined portion row, the individual joined portions 15 constituting the joined portion row may all have the same shape or may include joined portions having two or more different shapes.

In the natural state of the sheet 10 for a mask, when a unit area of the second fiber layer 12 in a planar projection view thereof is represented by S0, and the surface area of the second fiber layer 12 in the unit area S0 is represented by S1, it is preferable that the value of S1 is greater than the value of S0 due to the fact that the second fiber layer 12 has the projecting-and-depressed structure. That is to say, as a result of the second fiber layer 12 having the projecting-and-depressed structure, the effective area through which air passes is increased compared with the case where the second fiber layer 12 does not have the projecting-and-depressed structure. The increase in the effective area can effectively suppress an increase in the ventilation resistance of the sheet 10 for a mask. In view of this, in the natural state of the sheet 10 for a mask, the ratio of the surface area 51 of the second fiber layer 12 per unit area S0 in a planar projection view is preferably greater than 1, more preferably 1.3 or greater, and even more preferably 1.5 or greater.

Also, in order to achieve the shape stability of the projections 13, in the natural state of the sheet 10 for a mask, the ratio of the surface area S1 of the second fiber layer 12 per unit area S0 in a planar projection view is preferably 3 or less, more preferably 2.8 or less, and even more preferably 2.5 or less.

In view of the above, in the natural state of the sheet 10 for a mask, the ratio of the surface area S1 of the second fiber layer 12 per unit area S0 in a planar projection view is preferably greater than 1 and 3 or less, more preferably from 1.3 to 2.8, and even more preferably from 1.5 to 2.5.

As described above, the trapping ratio H of the sheet 10 for a mask can be adjusted as desired, depending on the fiber diameter and the basis weight of the second fiber layer 12, which has the function of a filter medium. On the other hand, an increase in the trapping ratio H of the sheet 10 for a mask reduces the amount of air that can pass through the mask, and thus results in an increase in the ventilation resistance R. As such, there is a tradeoff relationship between the trapping ratio H and the ventilation resistance R, and it is not easy to achieve both high particle trapping performance and low ventilation resistance to a high degree. In the present invention, the surface area per unit area, S1/S0, of the sheet 10 for a mask can be increased as a result of the second fiber layer 12 having the projecting-and-depressed structure. Thus, as is clear from a comparison between examples and comparative examples, which will be described later, it can be seen that Examples 1 to 8 in which S1/S0 is greater than 1 can achieve both high particle trapping performance and low ventilation resistance to a high degree, compared with Comparative Examples 1 to 4 in which S1/S0 is 1.

The ratio of S1 to S0 is measured in the following manner. The sheet 10 for a mask is placed in the natural state, and any desired area S0' (e.g., 10 cm×10 cm=100 $cm^2$) is cut therefrom. Then, the cut sheet 10 for a mask is separated into the first fiber layer 11 and the second fiber layer 12 through delamination. The area S1' of the second fiber layer 12 when it is laid flat without creases is measured, and the ratio of S1 to S0 is calculated from the formula below.

$$S1/S0=S1'/S0'$$

Figure 5:
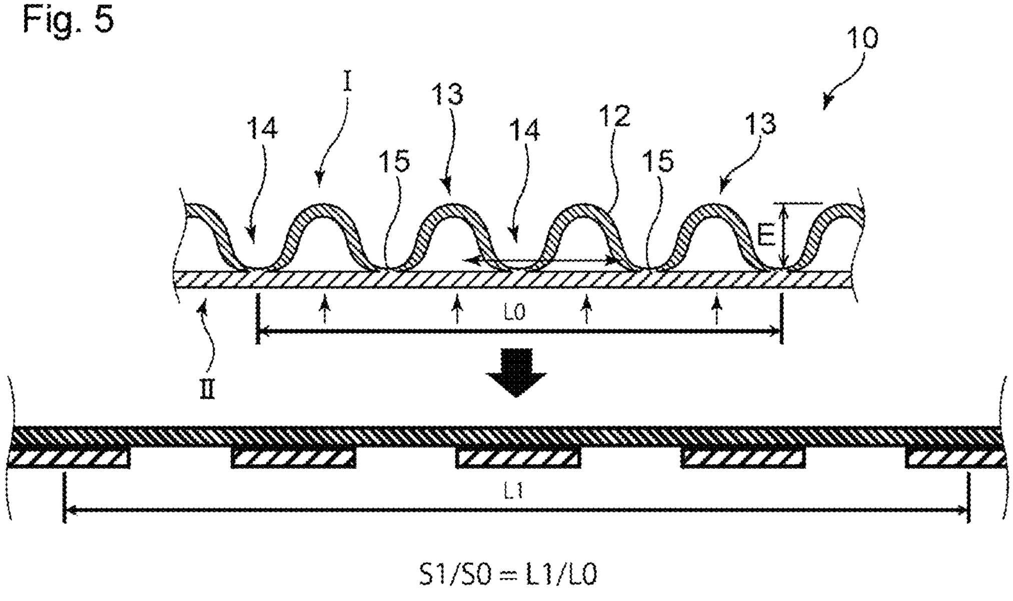
FIG. 5 is an explanatory diagram illustrating a method for measuring the ratio of the surface area of a second fiber layer per unit area in a planar projection view of the sheet for a mask.

However, depending on the state in which the first fiber layer 11 and the second fiber layer 12 are joined to each other, the second fiber layer may plastically deform during the delamination. In such a case, as shown in FIG. 5, the first fiber layer 11 can be divided into individual independent small pieces by cutting the first fiber layer 11 with a cutter or the like at the projections 13, where the two fiber layers are spaced apart from each other. As a result, the second fiber layer can be spread flat, and therefore the area S1' can be measured. When the sheet 10 for a mask has elasticity in only one direction, the value of S1/S0 can be obtained by calculating L1/L0 shown in FIG. 5, instead of S1'/S0' described above. Alternatively, the value of S1/S0 can also be calculated by capturing a magnified image of a cross section in the thickness direction of the sheet for a mask in the natural state using a microscope, and measuring the length of the outline of the second fiber layer from the captured image. In addition, when a sheet with elasticity is used as the first fiber layer 11, the value of S1/S0 can also be calculated by making marks at two points on the sheet 10 for a mask in the natural state, the two points being separated by a predetermined distance in the direction in which the sheet can be stretched, and then measuring the distance between the marks when the sheet 10 for a mask is stretched in the stretchable direction until the second fiber layer becomes flat without creases. Note that, even when the sheet 10 for a mask has the third fiber layer 33 (see FIG. 15), which will be described later, and even when the sheet 10 for a mask has the fourth fiber layer 43 (see FIGS. 16 and 17), the measurement can be performed in a similar manner.

In order to successfully realize the above-described effective area of the second fiber layer 12, the center-to-center distance between adjacent projections 13, or the pitch of the projections 13, in the natural state of the sheet 10 for a mask is preferably set to 6 mm or less, more preferably 5 mm or less, and even more preferably 4 mm or less.

Also, in order to achieve the shape stability of the projections 13, the center-to-center distance between adjacent projections 13 in a plan view of the sheet 10 for a mask in the natural state is preferably set to 1 mm or greater, more preferably 1.5 mm or greater, and even more preferably 2 mm or greater.

In view of the above, the center-to-center distance between adjacent projections 13 in a plan view of the sheet 10 for a mask in the natural state is preferably set to 1 mm or greater and 6 mm or less, more preferably 1.5 mm or greater and 5 mm or less, and even more preferably 2 mm or greater and 4 mm or less.

In order to successfully realize the above-described effective area of the second fiber layer 12, it is also advantageous to adjust the height difference between the peak of each projection 13 and the bottom of a corresponding one of the depressions 14. More specifically, in the natural state of the sheet 10 for a mask, the height difference E (see FIG. 3) between the peak of each projection 13 on the first surface I side and the bottom of a depression 14 adjacent to that projection 13 is preferably set to 1 mm or greater, more preferably 1.5 mm or greater, and even more preferably 2 mm or greater.

In order to achieve the shape stability of the projections 13, in the natural state of the sheet 10 for a mask, the height difference E between the peak of each projection 13 and the bottom of a depression 14 adjacent to that projection 13 is preferably set to 4 mm or less, more preferably 3.5 mm or less, and even more preferably 3 mm or less.

In view of the above, in the natural state of the sheet 10 for a mask, the height difference E between the peak of each projection 13 and the bottom of a depression 14 adjacent to that projection 13 is preferably set to 1 mm or greater and 4 mm or less, more preferably 1.5 mm or greater and 3.5 mm or less, and even more preferably 2 mm or greater and 3 mm or less.

The height difference E between the peak of each projection 13 and the bottom of a corresponding one of the depressions 14 is measured in the following manner. First, as shown in FIG. 3, T1 is measured as the height of the peak of the projection 13. Then, T2 is measured as the height of the bottom of the depression 14. The height difference E can be obtained by calculating T1-T2. Note that, although FIG. 3 shows the second fiber layer 12 having a reduced thickness at the joined portions 15, T2 is defined at a non-joined portion. That is to say, T2 of the form shown in FIG. 3 is equal to the sum of the thickness of the first fiber layer 11 and the thickness of the second fiber layer 12. On the other hand, T1 is defined as the height obtained by adding the height of the hollow space inside the projection 13 to the thicknesses of the first fiber layer 11 and the second fiber layer 12. Therefore, the height difference E is the height of the hollow space itself. As a specific measurement method, it is possible to capture a magnified image of a cross section in the thickness direction of the sheet 10 for a mask using a microscope and directly measure the height difference E, or in other words, the height E of the hollow space through image processing. Alternatively, it is also possible to measure T1 and T2 by scanning over an upper surface of the sheet 10 for a mask using a laser displacement meter and then calculate the height difference E. Note that, even when the sheet 10 for a mask has the third fiber layer 33 (see FIG. 15), which will be described later, and even when the sheet 10 for a mask has the fourth fiber layer 43 (see FIGS. 16 and 17), the definition of the height difference E remains the same, and therefore, the measurement can be performed in a similar manner.

It is preferable that, on the first surface I and/or the second surface II of the sheet for a mask, there are 10 or more raised fibers per 1 cm, the raised fibers being raised 1 mm or greater in the sheet thickness direction from the surface, because, in this case, displacement is less likely to occur during use. The reduced likelihood of the occurrence of displacement is especially advantageous when the sheet 10 for a mask is used as, for example, a replacement filter sheet that can be removably attached to a mask body. In view of this, the number of raised fibers on the first surface I and/or the second surface II of the sheet 10 for a mask is preferably 10 fibers/cm or greater, more preferably 15 fibers/cm or greater, and even more preferably 18 fibers/cm or greater.

Also, in order to improve the texture and tactile feel of the sheet 10 for a mask, the number of raised fibers on the first surface I and/or the second surface II of the sheet for a mask is preferably 50 fibers/cm or less, more preferably 40 fibers/cm or less, and even more preferably 30 fibers/cm or less.

In view of the above, on the first surface I and/or the second surface II of the sheet 10 for a mask, the number of raised fibers that are raised 1 mm or greater in the sheet thickness direction from the surface is preferably from 10 to 50 fibers/cm, more preferably from 15 to 40 fibers/cm, and even more preferably from 18 to 30 fibers/cm.

When the sheet 10 for a mask is used as, for example, a replacement filter sheet that can be removably attached to a mask body, in order to reduce the likelihood of a filter sheet that is being used and the mask body becoming displaced relative to each other, it is particularly preferable that the number of raised fibers on the surface that serves as a non-skin-facing surface during use satisfies the above-described range. Typically, the outer surface of the first fiber layer 11 forms the second surface II, and it is even more preferable that the number of raised fibers on the second surface II has the above-described value.

The number of raised fibers of the sheet 10 for a mask is measured using the following method.

<Method of Measuring Raised Fibers>

Figure 6A:
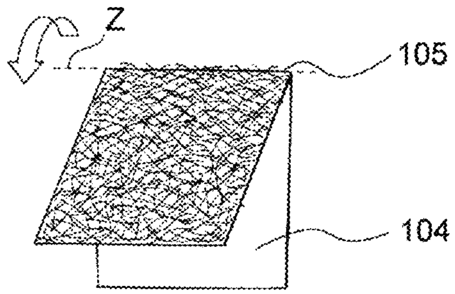
FIGS. 6(*a*), 6(*b*), and 6(*c*) are explanatory diagrams sequentially illustrating a method for measuring the number of raised fibers.
Figure 6B:
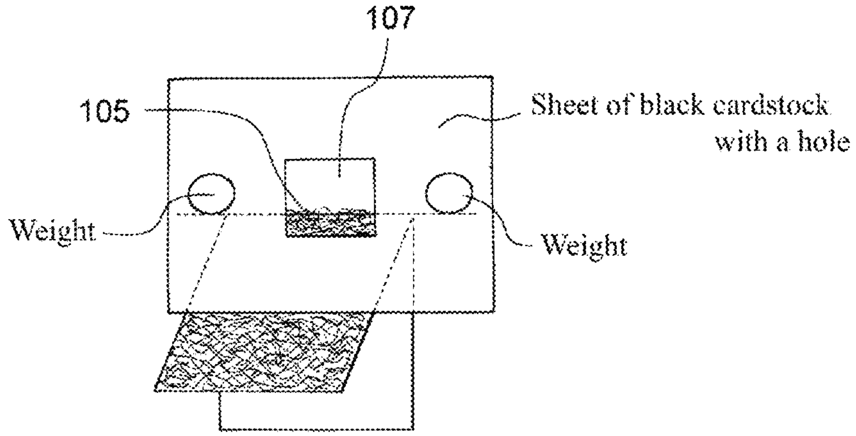
Figure 6C:
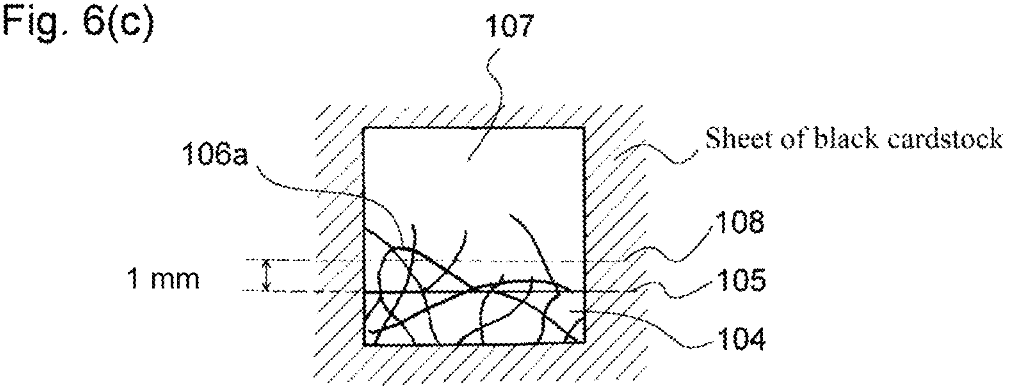

FIGS. 6(*a*) to 6(*c*) are schematic diagrams illustrating a method for measuring the number of raised fibers among fibers constituting the sheet 10 for a mask in an environment at 25° C. and 50% RH. First, a 40 mm×40 mm measurement piece is cut with a sharp razor from a sheet to be measured, and, as shown in FIG. 6(*a*), a surface with raised fibers, of the measurement piece is mountain folded along a folding line Z to form a measurement sample 104. Next, the measurement sample 104 is placed on a sheet of black cardstock, and as shown in FIG. 6(*b*), another sheet of black cardstock with a hole 107 of 10 mm (length)×10 mm (width) is placed on top of the measurement sample 104. At this time, as shown in FIG. 6(*b*), the upper sheet of black cardstock is disposed such that a folded edge 105 of the measurement sample 104 is visible through the hole 107 of the upper sheet of black cardstock. "Kenran (black), ream weight: 265 g" available from Fujikyowa Seishi is used as the two sheets of cardstock. Then, a weight of 50 g is placed on each lateral side of the hole 107 of the upper sheet of cardstock at a position 10 mm outward from the lateral side along the folded edge 105 to create a state in which the measurement sample 104 is completely folded. Next, as shown in FIG. 6(*c*), the inside of the hole 107 of the sheet of cardstock is observed at a magnification of 20 times using a microscope (VHX-900 manufactured by Keyence Corporation), and the number of raised fibers per 1 cm is measured, where fibers that are raised above an imaginary line 108 formed at a position that is parallel to and 1 mm above the folded edge 105 of the measurement sample 104 are regarded as raised fibers. The measurement is performed at nine locations, and an average value (rounded off to one decimal place) of the measured values is used as the number of raised fibers. Note that, when counting the number of raised fibers, if there is a fiber that, for example, crosses the imaginary line 108, which is located 1 mm above the folded edge 105, twice as in the case of a fiber 106*a* shown in FIG. 6(*c*), that fiber is counted as two fibers. Specifically, in the example shown in FIG. 6(*c*), there are four fibers that crosses the imaginary line 108 once and one fiber 106*a* that crosses the imaginary line 108 twice, but the fiber 106*a* that crosses the imaginary line 108 twice is counted as two fibers, and accordingly, the number of raised fibers is six.

To raise fibers on the first surface I and/or the second surface II of the sheet 10 for a mask so that the number of raised fibers satisfies the above-described value, for example, in a first method for producing a sheet for a mask illustrated in FIG. 10, which will be described later, a composite material 11B serving as a precursor of a fiber sheet 11A that is used as a raw fabric for forming the first fiber layer 11 can be drawn using a toothed drawing apparatus 25.

In order to achieve both high particle trapping performance and favorable air permeability, and to facilitate the production, it is preferable that one or both of the first fiber layer 11 and the second fiber layer 12 that constitute the sheet 10 for a mask are made of a nonwoven fabric produced using a predetermined method. The nonwoven fabric may be of one type selected from, for example, a spunbonded nonwoven fabric, an air-through nonwoven fabric, a melt-blown nonwoven fabric, and an electrospun nonwoven fabric. In addition, a laminate of two or more types of nonwoven fabrics of these nonwoven fabrics or a laminate of any of these nonwoven fabrics and another nonwoven fabric may also be used.

There is no particular limitation on the type of resins constituting these nonwoven fabrics, as long as the resins have the ability to form fibers. For example, a polyolefin resin or a polyester resin can be used.

In particular, the second fiber layer 12 mainly has the function of a filter medium as described above, and therefore it is desirable that the second fiber layer 12 is made of a nonwoven fabric that can easily achieve this purpose. In view of this, it is preferable that the second fiber layer 12 is a melt-blown nonwoven fabric or an electrospun nonwoven fabric.

In particular, an electrospun nonwoven fabric is more preferable, with which a filter layer can be constituted by finer fibers, and an improvement in trapping performance and a reduction in basis weight can thus be achieved.

A melt-blown nonwoven fabric is a nonwoven fabric produced by conveying and drawing a melt of a raw material resin having the fiber-forming ability in hot air stream to form fibers, and accumulating the fibers onto a collector. An electrospun nonwoven fabric is a nonwoven fabric produced by ejecting a charged solution or melt of a resin having the fiber-forming ability into an electric field and drawing the ejected liquid by means of the electric field to form fibers, and accumulating the fibers onto a collector.

On the other hand, the first fiber layer 11 mainly has the function of a support in the sheet 10 for a mask as described above, and therefore it is desirable that the first fiber layer 11 is made of a nonwoven fabric that can easily achieve this purpose. In view of this, it is preferable that the first fiber layer 11 is a spunbonded nonwoven fabric, an air-through nonwoven fabric, a spunlaced nonwoven fabric, or a needlepunched nonwoven fabric, or a laminate of two or more types of nonwoven fabrics of these nonwoven fabrics or a laminate of any of these nonwoven fabrics and another nonwoven fabric or another material.

In particular, a spunbonded nonwoven fabric is more preferable, which has high strength and hence good shape retention properties and can therefore protect the second fiber layer.

In particular, when producing the sheet 10 for a mask using the first production method illustrated in FIG. 10, which will be described later, it is preferable to use a nonwoven fabric having elasticity as the first fiber layer 11. Examples of the nonwoven fabric having elasticity include a nonwoven fabric containing elastic fibers as constituent fibers, a composite material of a nonwoven fabric made of non-elastic fibers and an elastic material (for example, elastic filaments), and the like.

When the first fiber layer 11 has elasticity, typically, the entire sheet 10 for a mask also exhibits elasticity. In this case, the extending direction of the projections 13 and the depressions 14 is perpendicular to the direction in which the first fiber layer 11 has elasticity. For example, when applying the sheet 10 for a mask to a mask, it is preferable to make the direction in which the first fiber layer 11 has elasticity substantially coincide with the direction from the mouth to the ears, in order to improve the fit. In other words, the extending direction of the projections 13 and the depressions 14 is substantially perpendicular to the direction from the mouth to the ears in the mask.

Figure 7:
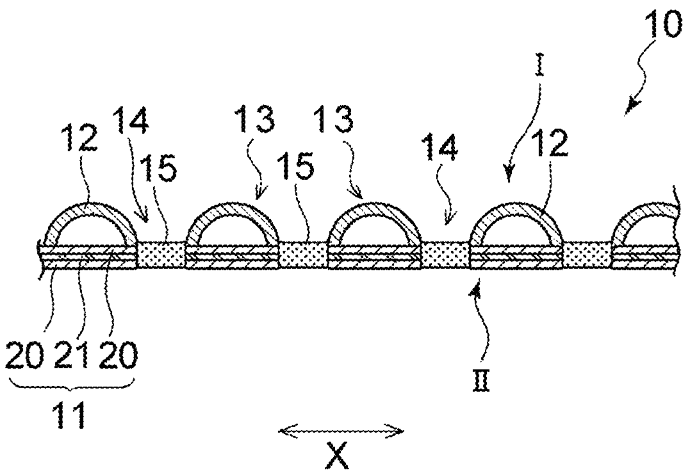
FIG. 7 is an enlarged cross-sectional view of a portion of the sheet for a mask shown in FIG. 2.

A nonwoven fabric particularly suitably used as the first fiber layer 11 is a nonwoven fabric containing elastic filaments, and a nonwoven fabric even more suitably used is a nonwoven fabric containing elastic filaments and non-elastic fibers. FIG. 7 shows a sheet 10 for a mask, the sheet 10 including a first fiber layer 11 made of a nonwoven fabric containing elastic filaments and non-elastic fibers.

It is preferable that, in the first fiber layer 11, an elastic filament 21 in a substantially non-stretched state is joined to nonwoven fabrics 20 containing non-elastic fibers. Also, it is preferable that the first fiber layer 11 has a configuration in which a plurality of elastic filaments 21 are joined to the two nonwoven fabrics 20.

The plurality of elastic filaments 21 are preferably arranged extending in a single direction X without crossing each other, and elasticity in the single direction X can be achieved by this arrangement. In addition, this arrangement has the advantage of making the first fiber layer 11, and the sheet 10 for a mask including the first fiber layer 11, less subject to shrinkage in width, that is, shrinking in a width direction that is perpendicular to the extending direction of the elastic filaments 21, when stretched in the extending direction of the elastic filaments 21. The elastic filaments 21 may each extend linearly or meanderingly as long as they do not cross each other. This embodiment is shown in FIG. 7.

In addition, it is preferable that the plurality of elastic filaments 21 are arranged spaced apart from each other in a direction Y that is perpendicular to the direction X. This embodiment is shown in FIG. 4.

It is preferable that one or more nonwoven fabrics 20 constituting the first fiber layer 11 are all stretchable. Typically, the one or more nonwoven fabrics 20 contain substantially non-elastic fibers and are therefore substantially non-elastic.

The term "elastic" of the elastic filaments 21 and the term "elastic" of the nonwoven fabric(s) 20 being non-elastic refer to the capability of being stretched and returning to a length that is 110% or less of an original length after they are stretched 50% of the original length (i.e., stretched to 150% of the original length, or 1.5 times the original length) and the stretching force is released.

To check the "elasticity" of the first fiber layer 11 of the sheet 10 for a mask, the sheet 10 for a mask can be used as it is and subjected to the above-described method to check the "elasticity" of the first fiber layer 11, by using the fact that the second fiber layer 12 "does not have elasticity". Alternatively, as in the method described above, the sheet 10 for a mask may be separated into the first fiber layer 11 and the second fiber layer 12 through delamination, and the "elasticity" of the first fiber layer 11 may be directly measured using the above-described method.

It is preferable that the nonwoven fabrics 20 are stretchable in the same direction as the direction X, in which the elastic filaments 21 extend.

As used herein, the term "stretchable" encompasses (a) a case where the constituent fibers themselves of the nonwoven fabrics 20 can be stretched, and (b) a case where the constituent fibers themselves cannot be stretched, but each nonwoven fabric can be stretched as a whole due to separation of fibers that are bonded to each other at intersections, a structural change in a three-dimensional structure formed by a plurality of fibers through bonding or the like between the fibers, breakage of constituent fibers, or removal of the slack from fibers.

Each nonwoven fabric 20 may already be stretchable in a state in which it is a raw fabric before being joined to the elastic filaments 21. Alternatively, each nonwoven fabric 20 may not be stretchable in the state in which it is a raw fabric before being joined to the elastic filaments 21, but may be made stretchable by being processed so as to have stretchability after being joined to the elastic filaments 21. Specific methods for making a nonwoven fabric 20 stretchable include heat treatment, drawing between rollers, drawing using meshing teeth and grooves or gears, tensile drawing using a tenter, and the like. Taking into account a preferred method for producing the sheet 10 for a mask, which will be described later, it is preferable that each nonwoven fabric 20 is not stretchable in the state in which it is a raw fabric, because, for example, the nonwoven fabric 20 is easy to convey during fusing of the elastic filaments 21 to the nonwoven fabric 20.

It is preferable that each of the plurality of elastic filaments 21 constituting the first fiber layer 11 is substantially continuous over the entire length of the first fiber layer 11. Each elastic filament 21 typically contains an elastic resin.

The elastic filaments 21 may be filamentous synthetic or natural rubber. Alternatively, the elastic filaments 21 may be obtained through dry spinning (melt spinning) or wet spinning. It is preferable that the elastic filaments 21 are obtained through direct melt spinning without being temporarily spooled. Also, it is preferable that the elastic filaments 21 are obtained by drawing undrawn yarns.

Also, it is preferable that the elastic filaments 21 are formed by drawing a molten or softened elastic resin. This makes it easy to join the elastic filaments 21 in a non-stretched state to the nonwoven fabrics 20.

Specific drawing operations include (a) an operation of melt spinning a resin serving as the raw material of the elastic filaments 21 to temporarily obtain undrawn yarns and then re-heating elastic filaments formed by the undrawn yarns to draw the elastic filaments at a softening temperature (glass transition temperature Tg of hard segments) or higher, and (b) an operation of melt spinning a resin serving as the raw material of the elastic filaments 21 and directly drawing the obtained molten fibers. In the preferred method for producing the sheet 10 for a mask, which will be described later, the elastic filaments 21 are obtained by directly drawing molten fibers obtained through melt spinning.

It is preferable that each elastic filament 21 is joined to the nonwoven fabrics 20 over its entire length.

The wording "joined over its entire length" does not require that all the fibers (constituent fibers of the nonwoven fabrics 20) that are in contact with the elastic filament 21 are joined to the elastic filament 21, but means that the elastic filament 21 is joined to constituent fibers of the nonwoven fabrics 20 in such a manner that there are no intentionally formed non-joined portions in the elastic filament 21.

Examples of the mode for joining the elastic filament 21 to the nonwoven fabrics 20 include fusing, bonding using an adhesive, and the like. It is also preferable to fuse an elastic filament 21 obtained through melt spinning to the nonwoven fabrics 20 before the elastic filament 21 solidifies. In this case, before joining the elastic filament 21 to the nonwoven fabrics 20, it is possible to apply an adhesive as an auxiliary joining means. Alternatively, after joining the elastic filament 21 to each nonwoven fabric 20, it is possible to perform heat treatment (steam jetting, heat embossing), mechanical interlacing (needlepunching, spunlacing), or the like as an auxiliary joining means.

In order to improve the softness of the first fiber layer 11, it is preferable that the joining between the elastic filament 21 and the nonwoven fabrics 20 is achieved only by the elastic filament 21 in a molten or softened state solidifying while being in contact with the nonwoven fabrics 20, or in other words, the elastic filament 21 is joined to the nonwoven fabrics 20 without using an adhesive.

The elasticity of the first fiber layer 11 is exhibited due to the elastic filaments 21 being elastic. When the first fiber layer 11 is elongated in the same direction as the extending direction of the elastic filaments 21, the elastic filaments 21 and the nonwoven fabrics 20 are stretched. Then, when the elongation of the first fiber layer 11 is canceled, the elastic filaments 21 contract, and, as the elastic filaments 21 contract, the nonwoven fabrics 20 return to the original state prior to the elongation.

It is preferable to use a first fiber layer 11 obtained by preparing a non-stretchable composite material by joining elastic filaments 21 in a non-stretched state to nonwoven fabrics 20 that do not have elasticity, and then passing this composite material as a raw fabric sheet between a pair of intermeshing projecting-and-depressed surfaces that alternately have ridge portions and grooves, or specifically, between a pair of toothed rollers 26 and 27, to thereby impart elasticity to the composite material. This embodiment is shown in FIG. 10.

As a preferred example of the first fiber layer 11 for use in the sheet 10 for a mask, an embodiment is conceivable in which a first fiber layer 11 is produced by passing a non-stretchable composite material 11B (see FIG. 10) between the pair of toothed rollers 26 and 27. The first fiber layer 11 markedly has a form described below when such a toothed drawing apparatus is used in an elasticity imparting processing step for obtaining the first fiber layer 11 from the non-stretchable composite material 11B.

Specifically, in the first fiber layer 11 in a stretched state, high basis weight portions 22 and low basis weight portions 23 are alternately arranged in the extending direction X of the elastic filaments 21. The high basis weight portions 22 and the low basis weight portions 23 each extend in a strip-like form in the direction Y that is perpendicular to the extending direction X of the elastic filaments 21. The high basis weight portions 22 have a greater basis weight and a greater thickness than the low basis weight portions 23. The low basis weight portions 23 have a smaller basis weight and a smaller thickness than the high basis weight portions 22.

It is preferable that the high basis weight portions 22 and the low basis weight portions 23 are alternately arranged in fixed cycles.

It is preferable that the high basis weight portions 22 have substantially equal widths, and it is preferable that the low basis weight portions 23 also have substantially equal widths. The high basis weight portions 22 having substantially equal widths means that the difference in width between the largest width and the smallest width of the plurality of high basis weight portions 22 is within 10%. The low basis weight portions 23 having substantially equal widths means that the difference in width between the largest width and the smallest width of the plurality of low basis weight portions 23 is within 10%.

Figure 8:
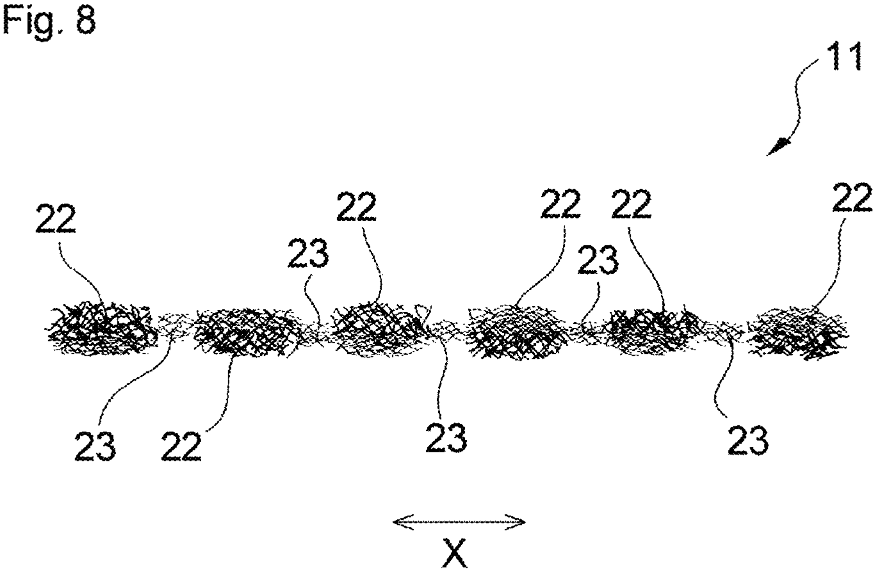
FIG. 8 is a cross-sectional view schematically showing the structure of a first fiber layer of the sheet for a mask.

FIG. 8 shows a cross-sectional view of this embodiment taken along the extending direction X of the elastic filaments 21.

Next, a preferred method for producing a sheet for a mask will be described. A first method for producing a sheet for a mask of the present invention includes a joining step of partially joining a first fiber sheet 11A to a second fiber sheet 12A, which is a raw fabric for forming the second fiber layer 12, to obtain a sheet 10 for a mask.

In addition, it is preferable that the method for producing a sheet for a mask of the present invention has a precursor producing step of producing a composite material 11B, which is a precursor of the first fiber sheet 11A serving as a raw fabric for forming the first fiber layer 11, and an elasticity imparting processing step of drawing the composite material 11B to obtain the first fiber sheet 11A that has elasticity, which is the raw fabric for forming the first fiber layer 11. This embodiment is shown in FIG. 10.

More specifically, it is preferable that the present production method has a step of superposing the second fiber sheet 12A on one surface side of the first fiber sheet 11A that has elasticity in a state in which the first fiber sheet 11A is stretched, and a step of partially joining the two sheets 11A and 12A to each other.

In addition, it is preferable that, in order to obtain the first fiber sheet 11A that has elasticity, the precursor producing step and the drawing step are performed as upstream steps.

A fiber sheet having a smaller average fiber diameter than the first fiber sheet 11A is suitably used as the second fiber sheet 12A. The reason for this is that, in the sheet 10 for a mask, the second fiber sheet 12A is used in a portion having the function of a filter medium, and the first fiber sheet 11A is used in a portion having the function of a support.

In the precursor producing step, preferably, a plurality of elastic filaments 21 are joined to the nonwoven fabrics 20 while extending in one direction and being in a substantially non-stretched state, to obtain the composite material 11B, which is the precursor of the first fiber sheet 11A. More specifically, it is preferable that, while a large number of molten elastic filaments 21 discharged from spinning nozzles 16 are taken up at a predetermined speed and drawn, the elastic filaments 21 are fused to the two nonwoven fabrics 20, before the elastic filaments 21 solidify, such that the elastic filaments 21 are arranged extending in one direction without crossing each other. In this manner, the composite material 11B serving as the precursor of the first fiber sheet 11A is produced in which the plurality of elastic filaments 21 in a substantially non-stretched state are joined to the nonwoven fabrics 20 over the entire length of each elastic filament 21.

The spinning nozzles 16 for forming the elastic filaments 21 are provided in a spinning head 17, and the spinning head 17 is connected to an extruder. A resin may be supplied to the spinning head 17 via a gear pump. The elastic resin that is melt-kneaded by the extruder is supplied to the spinning head 17.

In the spinning head 17, it is preferable that a large number of spinning nozzles 16 are arranged in a straight line. It is preferable that the spinning nozzles 16 are arranged in the width direction of the two nonwoven fabrics 20.

The discharged molten elastic filaments 21 merge with the two nonwoven fabrics that are unwound from the respective raw fabrics at the same speed, sandwiched between the two nonwoven fabrics 20, and taken up at a predetermined speed.

It is preferable that the take-up speed of the elastic filaments 21 matches the unwinding speed of the two nonwoven fabrics 20.

It is preferable that the take-up speed of the elastic filaments 21 is adjusted relative to the resin discharge speed in spinning nozzle holes so that the drawing factor of the elastic filaments 21 is 1.1 times or greater, preferably 4 times or greater, and even more preferably 10 times or greater.

Also, it is preferable that the take-up speed of the elastic filaments 21 is adjusted so that the drawing factor is 400 times or less, preferably 100 times or less, and even more preferably 80 times or less.

It is preferable that the elastic filaments 21 merge with the two nonwoven fabrics before the elastic filaments 21 solidify, that is, in a fusible state. As a result, the elastic filaments 21 are fused to the two nonwoven fabrics 20 in a state in which the elastic filaments 21 are sandwiched between these nonwoven fabrics 20. That is to say, the elastic filaments 21 are fused to the two nonwoven fabrics 20 only by the heat of fusion of the elastic filaments 21 that are in the fusible state. Consequently, the resulting first fiber sheet 11A is unlikely to have stiffness that would occur if an adhesive is applied to the entire boundary surfaces of the nonwoven fabrics 20, and thus has excellent softness as a sheet.

When the elastic filaments 21 merge with the two nonwoven fabrics 20, it is preferable that the elastic filaments 21 are arranged extending in one direction without crossing one another. Then, it is preferable that, in a state in which the elastic filaments 21 have merged with the two nonwoven fabrics 20 containing non-elastic fibers and are sandwiched between the two nonwoven fabrics 20, the three members are compressed together between a pair of nip rollers 18. In this manner, the composite material 11B in which the elastic filaments 21 are sandwiched between the two nonwoven fabrics 20 is obtained.

In the case where nonwoven fabrics that are essentially non-stretchable are used as the two nonwoven fabrics 20, it is preferable to perform an elasticity imparting processing step for making the nonwoven fabrics 20 stretchable.

Figure 9:
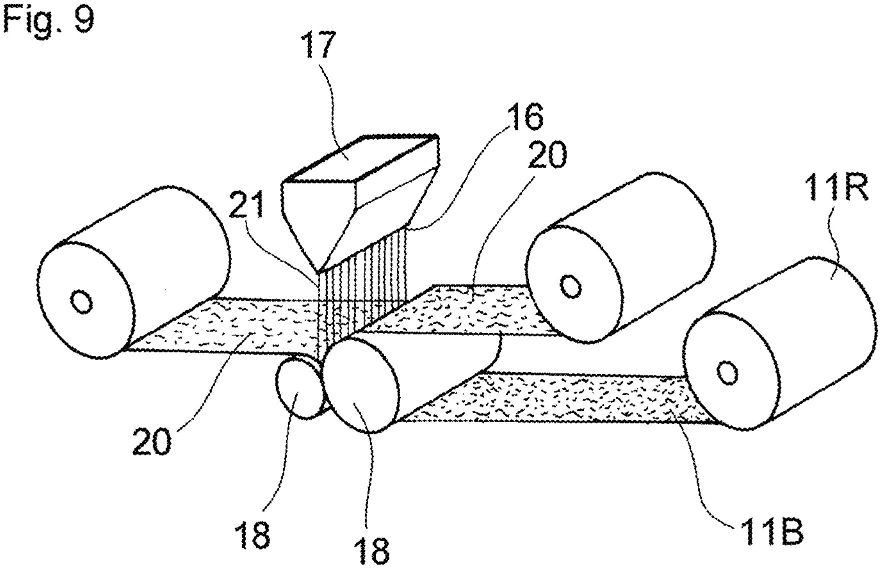
FIG. 9 is a diagram showing an example of an apparatus for producing the first fiber layer of the sheet for a mask.

In the elasticity imparting processing step of the present embodiment, the two nonwoven fabrics 20 are subjected to drawing processing using a toothed drawing apparatus 25. This embodiment is shown in FIGS. 9 and 10.

In this drawing processing, the composite material 11B is drawn in the extending direction of the elastic filaments 21 to impart stretchability to the two nonwoven fabrics 20. "Imparting stretchability" here also includes the case of significantly improving the stretchability of slightly stretchable nonwoven fabrics 20.

It is preferable that the toothed drawing apparatus 25 includes a pair of intermeshing toothed rollers 26 and 27, the toothed rollers each having teeth and grooves alternately in its circumferential direction, the teeth being ridge portions extending in an axial direction of the roller and the grooves each being formed between teeth and extending in the axial direction.

In the elasticity imparting processing step that uses the toothed drawing apparatus 25, the composite material 11B obtained in the precursor producing step is fed between the pair of toothed rollers 26 and 27 and drawn, and thus, a first fiber sheet 11A in which the nonwoven fabrics 20 of the composite material 11B are made stretchable is obtained. With regard to the tooth profile of the toothed rollers 26 and 27, a commonly used involute tooth profile or cycloid tooth profile can be used. In particular, an involute tooth profile or cycloid tooth profile with a reduced face width is preferable.

In this manner, the first fiber sheet 11A is obtained by partially drawing the composite material 11B using the pair of toothed rollers 26 and 27 or the like. The obtained first fiber sheet 11A exhibits elasticity in the extending direction of the elastic filaments 21.

Figure 10:
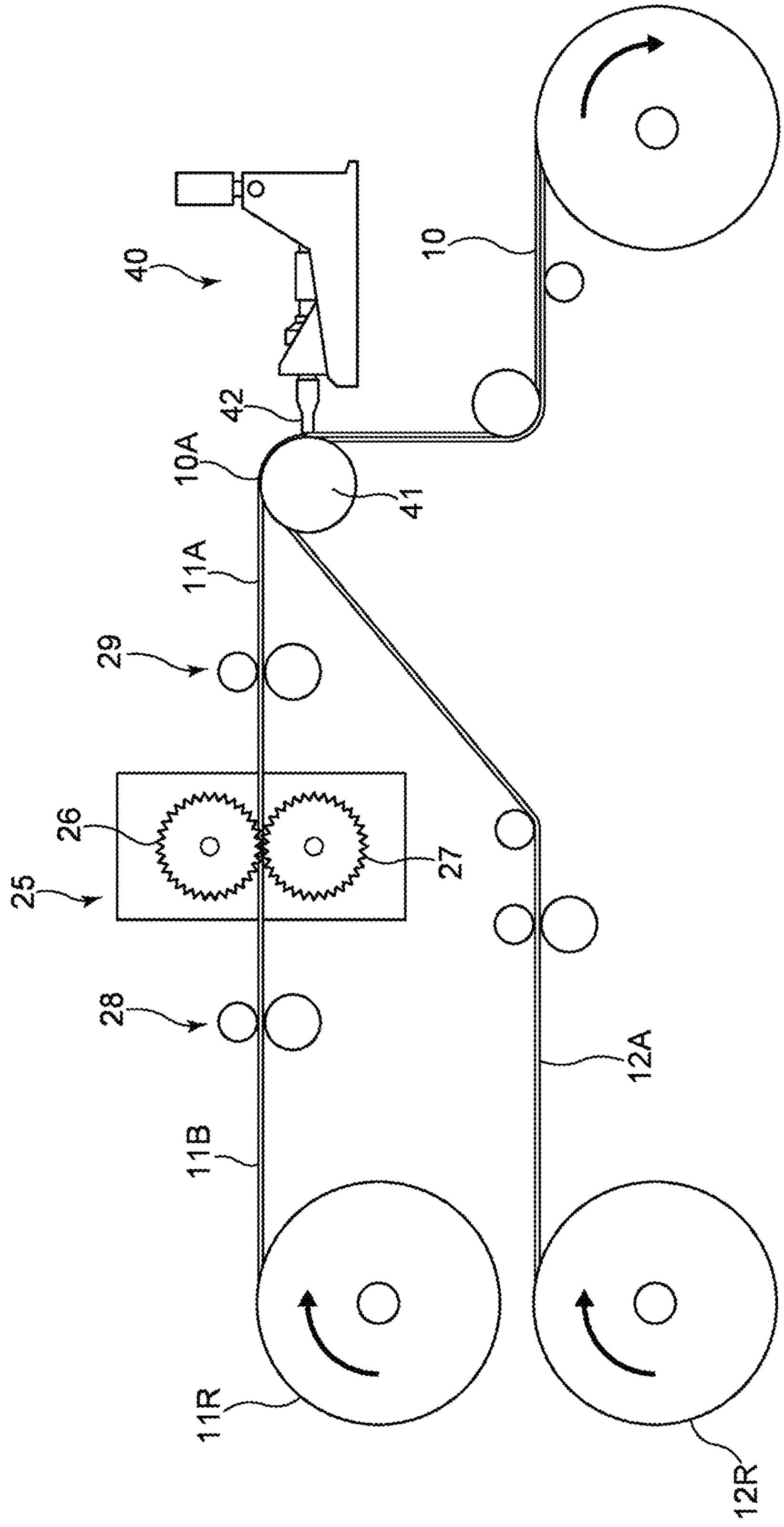
FIG. 10 is a diagram showing an apparatus for producing the sheet for a mask.

Note that FIGS. 9 and 10 illustrate a case in which, after the composite material 11B is wound into roll form to obtain a roll 11R, the composite material 11B unwound from the roll 11R is subjected to the drawing processing, but the produced composite material 11B may also be introduced into the toothed drawing apparatus that uses the toothed rollers 26 and 27 without being wound into roll form.

The thus obtained first fiber sheet 11A is in a state in which it is stretched in the conveyance direction, and it is preferable that the first fiber sheet 11A merges with the second fiber sheet 12A in this stretched state.

In the joining step of the present embodiment, it is preferable that a sheet stack 10A in which the first fiber sheet 11A in the stretched state and the second fiber sheet 12A are superposed one on the other is subjected to joining processing for partially joining the first fiber sheet 11A and the second fiber sheet 12A to each other.

Any apparatus that is capable of partially joining the first fiber sheet 11A and the second fiber sheet 12A to each other can be used for the joining processing. For example, a heat sealing apparatus, an ultrasonic sealing apparatus, a high-frequency sealing apparatus, or the like can be used.

A stretching factor in the extending direction of the elastic filaments 21, of the first fiber sheet 11A at the time when being joined to the second fiber sheet 12A is preferably 1.1 times or greater, and more preferably 1.2 times or greater.

Also, the above-described stretching factor of the first fiber sheet 11A is preferably 3 times or less, and more preferably 2.5 times or less.

It is preferable that, at the time when the first fiber sheet 11A and the second fiber sheet 12A are being joined to each other, the conveyance direction of the two sheets 11A and 12A matches the extending direction of the elastic filaments 21. The stretching factor of the first fiber layer 11A is obtained by dividing its length in the stretched state by its length under no external force prior to stretching, or in other words, the length in the natural state.

It is preferable that the joining processing for partially joining the first fiber sheet 11A and the second fiber sheet 12A to each other is performed using an ultrasonic sealing apparatus 40 including an ultrasonic horn 42.

The ultrasonic sealing apparatus 40 includes a support roller 41 that typically supports a surface of the sheet stack 10A opposite to a surface of the sheet stack 10A that faces the ultrasonic horn 42 and that is to be exposed to ultrasonic waves.

In addition, it is preferable that joining projections (not shown) is formed on a leading end surface of the ultrasonic horn 42, or on a surface of the support roller 41, in a pattern corresponding to that of the joined portions 15 formed on the sheet 10 for a mask. The ultrasonic horn 42 applies ultrasonic waves to the sheet stack 10A in a state in which the sheet stack 10A is held between the support roller 41 and the ultrasonic horn 42. As a result, in the sheet stack 10A, the nonwoven fabrics 20, which constitute the first fiber sheet 11A, and/or the second fiber sheet 12A is melted or softened, and joined portions 15 where the first fiber sheet 11A and the second fiber sheet 12A are partially joined to each other are formed.

The surface of the sheet stack 10A that faces the ultrasonic horn 42 may be the surface on the first fiber sheet 11A side or the surface on the second fiber sheet 12A side.

This embodiment is shown in FIG. 10. In FIG. 10, reference numerals 28 and 29 denote nip rollers, and reference numeral 12R denotes a roll on which the second fiber sheet 12A is wound. Typically, the nip rollers are rollers having a smooth surface.

The support roller 41 may be driven so as to rotate, or may be a driven roller that rotates as the sheet is conveyed. Alternatively, the support roller 41 may be replaced by a non-rotating support member.

In the case where a plurality of joined portions 15 are to be formed intermittently in a direction that is perpendicular to the extending direction X of the elastic filaments 21, it is preferable that the sheet stack 10A is conveyed in the extending direction X of the elastic filaments 21. In addition, it is preferable to use an ultrasonic horn 42, or a support roller 41, in which joining projections (not shown) are arranged intermittently in a direction corresponding to the width direction of the sheet stack 10A.

A target sheet 10 for a mask is obtained by forming the joined portions 15 using the ultrasonic sealing apparatus 40. More specifically, by the tension applied to the sheet 10 for a mask in the conveyance direction being released, the elastic filaments 21 in the stretched state are allowed to contract. Accordingly, portions of the second fiber layer 12 that are located between the joined portions 15 protrude in a direction away from the first fiber layer 11. Thus, the sheet 10 for a mask in which a plurality of hollow projections 13 such as those shown in FIG. 2 are formed is obtained.

Next, a second method for producing a sheet for a mask will be described. Unlike the first production method, the present production method relates to a method for producing a sheet for a mask in which the first fiber layer 11 does not have elasticity.

The present production method includes a step of superposing the fiber sheet 11A, which is the raw fabric for forming the first fiber layer 11, on one surface side of the second fiber sheet 12A to which a projecting-and-depressed shape has been imparted, and a step of joining the second fiber sheet 12A and the first fiber sheet 11A to each other.

It is preferable that the method for producing a sheet for a mask of the present invention includes a step of imparting the projecting-and-depressed shape to the second fiber sheet 12A, which is the raw fabric for forming the second fiber layer 12.

Figure 11:
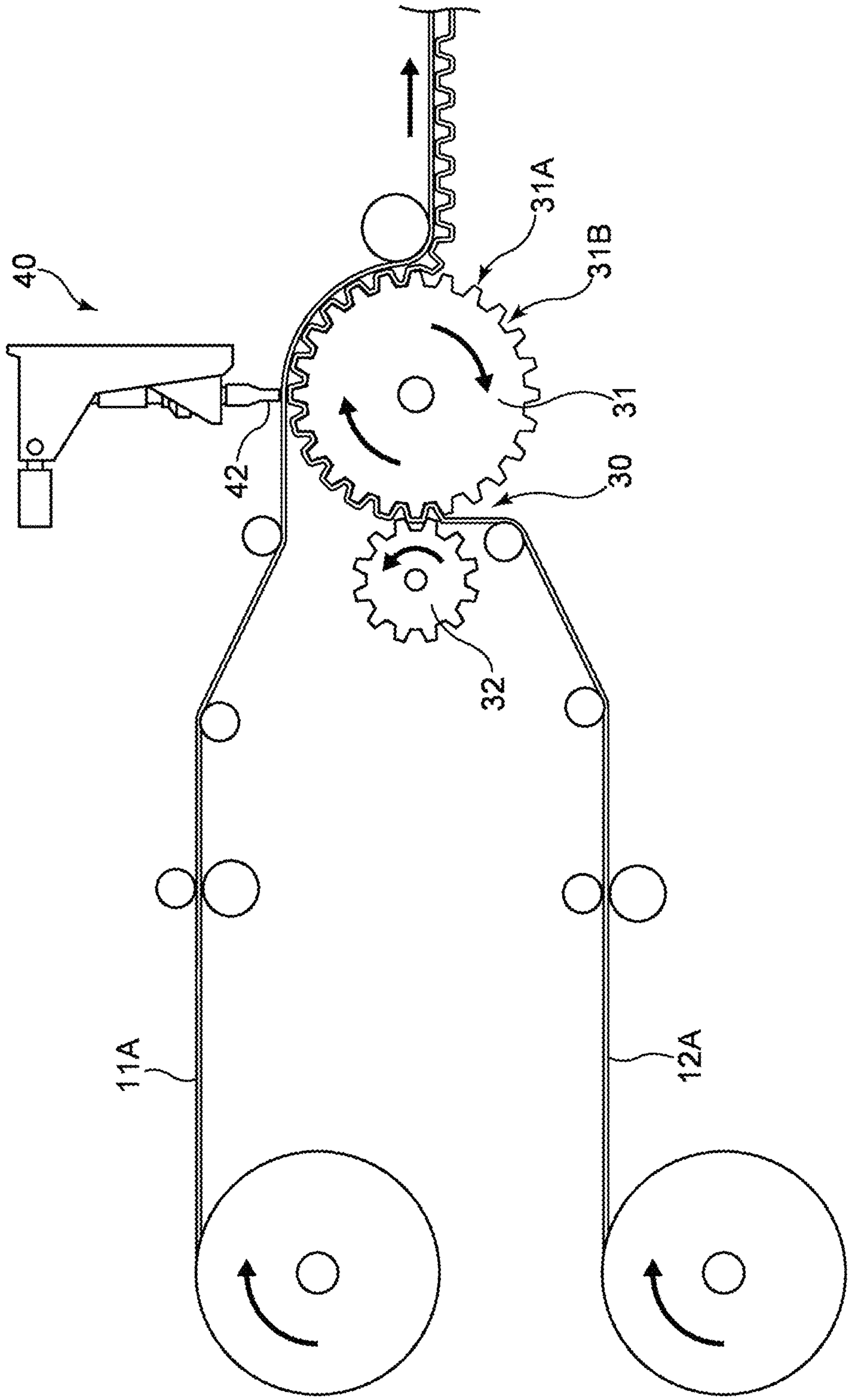
FIG. 11 is a diagram showing another example of the apparatus for producing the sheet for a mask.

In addition, it is preferable to join depressions of the second fiber sheet 12A, to which the projecting-and-depressed shape has been imparted, to the first fiber sheet 11A. This embodiment is shown in FIG. 11.

First, the process of imparting a projecting-and-depressed shape to the second fiber sheet 12A will be described. It is preferable that the process of imparting a projecting-and-depressed shape to the second fiber sheet 12A is performed using a shaping apparatus 30 that includes a first roller 31 having on its circumferential surface a projecting-and-depressed shape and a second roller 32 having on its circumferential surface a projecting-and-depressed shape that can mesh with the projecting-and-depressed shape of the first roller 31.

It is preferable that both the first roller 31 and the second roller 32 have a structure in which ridge portions 31A and groove portions 31B extending along a roller rotating shaft are provided alternately in a roller rotating direction.

The first roller 31 and the second roller 32 are configured to rotate in opposite directions in a state in which the circumferential surfaces of the two rollers mesh with each other.

In the state in which the two rollers 31 and 32 mesh with each other, the second fiber sheet 12A is fed to an engagement portion between the two rollers 31 and 32 to impart a projecting-and-depressed shape to the second fiber sheet 12A. In the engagement portion between the two rollers 31 and 32, a plurality of portions of the second fiber sheet 12A are pushed into groove portions of the first roller 31 by corresponding ridge portions of the second roller 32, and the pushed portions of the second fiber sheet 12A become projections 13 of a target sheet for a mask to be obtained.

In imparting the projecting-and-depressed shape, in order to ensure that the projecting-and-depressed shape is imparted to the second fiber sheet 12A, it is preferable to suction air on the circumferential surface of the first roller 31 such that air is suctioned from outside the circumferential surface toward inside the first roller 31, thereby bringing the second fiber sheet 12A into close contact with the circumferential surface. For this purpose, it is preferable that suction holes (not shown) are formed in the ridge portions of the first roller 31 in advance, and air is suctioned from the outside toward the inside of the first roller 31 through the suction holes.

It is preferable that the second fiber sheet 12A to which the projecting-and-depressed shape has been imparted is moved from the engagement portion by being conveyed while held on the circumferential surface of the first roller 31.

On the other hand, the first fiber sheet 11A is unwound from the raw fabric and superposed on the second fiber sheet 12A to which the projecting-and-depressed shape has been imparted. At the same time as or after the two sheets 11A and 12A are superposed on each other, the two sheets 11A and 12A are introduced into the ultrasonic sealing apparatus 40. It is preferable that the ultrasonic sealing apparatus 40 includes the ultrasonic horn 42. In the ultrasonic sealing apparatus 40, the first fiber sheet 11A and the second fiber sheet 12A are partially joined to each other to form the above-described joined portions 15.

It is preferable that the two sheets 11A and 12A are joined to each other between the ultrasonic horn 42 and the ridge portions 31A of the first roller 31. Therefore, the two sheets 11A and 12A are joined to each other by joining projections of the second fiber sheet 12A having the projecting-and-depressed shape, or in other words, portions of the second fiber sheet 12A that are located on the ridge portions of the first roller 31 to the first fiber sheet 11A.

In the present production method, as in the first production method, a fiber sheet having a smaller average fiber diameter than the first fiber sheet 11A is preferably used as the second fiber sheet 12A. Furthermore, in the present production method, unlike the first production method, the first fiber sheet 11A does not need to be in a stretched state.

With the production method shown in FIG. 11 as well, a target sheet for a mask can be successfully obtained.

Note that, in the production method shown in FIG. 11, since a projecting-and-depressed shape is imparted to the second fiber sheet 12A by the first roller 31 and the second roller 32, constituent fibers of the second fiber sheet 12A may be deformed. In contrast, in the previously described production method shown in FIG. 10, since a projecting-and-depressed shape is not imparted to the second fiber sheet 12A, the second fiber sheet 12A is not deformed. Therefore, when the production method shown in FIG. 11 and the production method shown in FIG. 10 are compared, the production method shown in FIG. 10 has the advantage that the second fiber sheet 12A undergoes less deformation.

A sheet for a mask thus obtained can itself be used as a mask body of a mask.

Figure 12A:
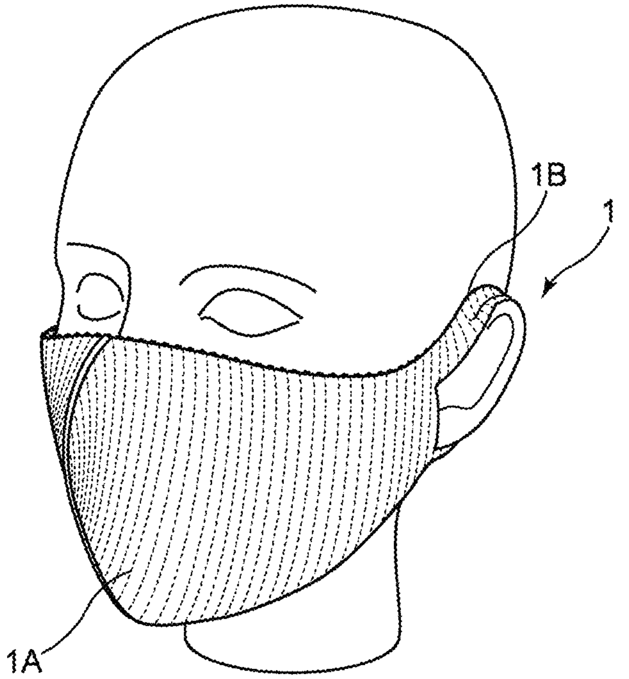
FIG. 12(*a*) is a perspective view showing a state in which a mask including the sheet for a mask is worn, and FIG. 12(*b*) is a perspective view showing the mask shown in FIG. 12(*a*), as viewed from inside the mask.
Figure 12B:
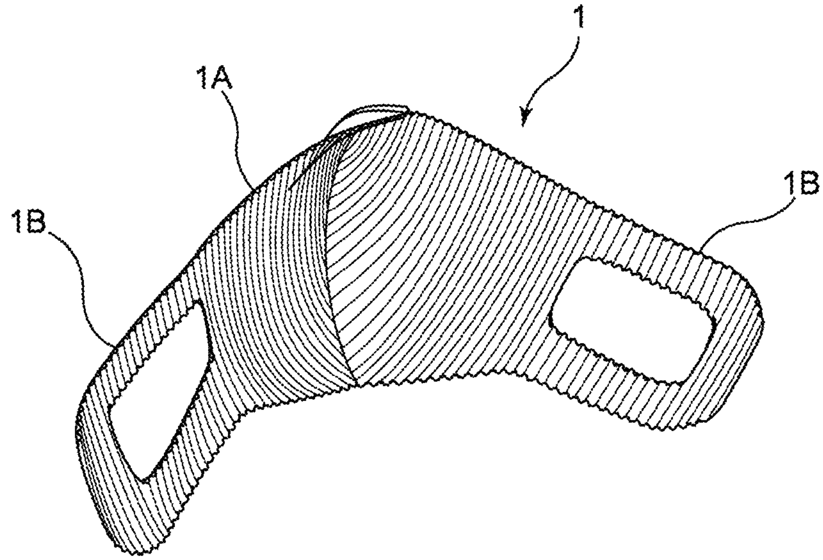

For example, in the case where a sheet 10 for a mask in which the second fiber layer 12 has a ridge-groove structure constituted by projections 13 and depressions 14 is used as a mask body of a mask, in order to achieve a good feel during use, it is preferable that the sheet 10 for a mask is incorporated in a mask 1 such that the projections 13 of the sheet 10 for a mask extend in the vertical direction of the mask 1. This embodiment is shown in FIGS. 12(*a*) and 12(*b*).

In addition, in the case where the first fiber layer 11 of the sheet 10 for a mask has elasticity, and hence the entire sheet 10 for a mask has elasticity, in order to improve the fit of the mask 1, it is preferable that the sheet 10 for a mask is incorporated in the mask 1 such that the direction of elasticity matches the lateral direction of the mask 1, or in other words, a connecting direction between a pair of ear hook portions 1B.

Furthermore, when incorporating the sheet 10 for a mask into the mask 1, it is preferable to use the first surface of the sheet 10 for a mask, which is the surface on which the projecting-and-depressed structure is formed, as a skin-facing surface in order to achieve a good feel during use.

The sheet for a mask of the present invention can be used not only as a mask body 1A of the mask 1, but also as the mask body 1A and the ear hook portions 1B. In this case, it is preferable that the mask body 1A and the ear hook portions 1B of the mask 1 are integrally formed, and there is no joint such as a seam between the mask body 1A and the ear hook portions 1B. This embodiment is shown in FIGS. 12(*a*) and 12(*b*). Such a mask 1 is suitably produced using a method illustrated in FIGS. 13(*a*) to 13(*c*), for example.

Figure 13A:
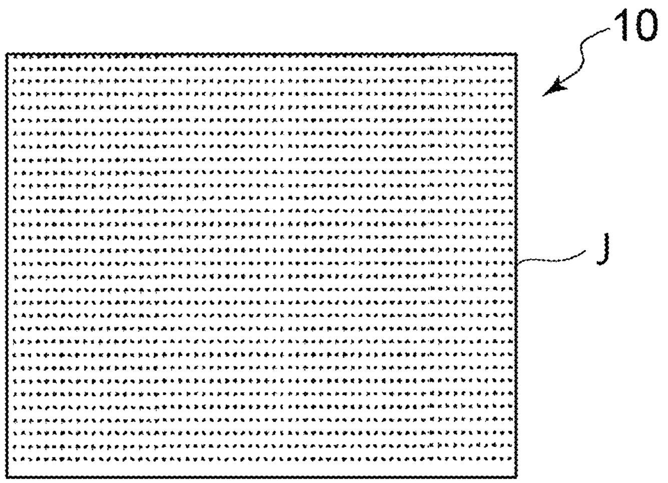
FIGS. 13(*a*) to 13(*c*) are diagrams sequentially illustrating steps for producing the mask shown in FIG. 12(*a*).
Figure 13B:
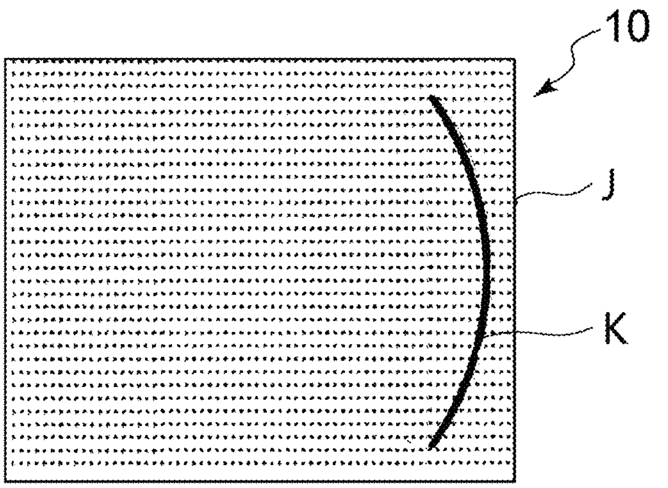
Figure 13C:
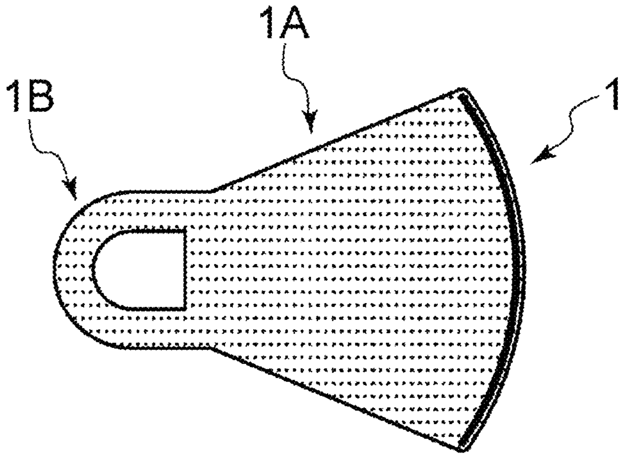

This is described in detail below. First, as shown in FIG. 13(*a*), the sheet 10 for a mask shown in FIG. 2, or a sheet 10 for a mask shown in FIG. 15, 16, or 17, which will be described later, is folded in two along a direction that is perpendicular to the extending direction of the projections 13 and the depressions 14 of the sheet 10 for a mask. It is preferable that the sheet 10 for a mask is folded in two such that the resulting two parts of the first surface of the sheet 10 for a mask face each other. Next, as shown in FIG. 13(*b*), the two parts of the sheet 10 for a mask that is folded in two are joined to each other near the folding line J. The joining is performed so as to form a curved joining line K that allows the vertical center line of the mask 1 to fit a line from the nose to chin of a person. Finally, as shown in FIG. 13(*c*), a portion of the sheet 10 for a mask that is folded in two is punched out so that the mask body 1A and the ear hook portions 1B are integrally formed. The target mask 1 can be successfully produced by sequentially performing these steps.

Instead of the above-described method, it is also possible to prepare two sheets 10 for a mask that have the same shape and superpose the prepared two sheets so as to form a stack in which the first fiber layer 11 side of each sheet 10 for a mask faces outward. A target mask 1 can be produced by subjecting this stack to the above-described processing illustrated in FIGS. 13(*b*) and 13(*c*).

The sheet for a mask of the present invention can be used not only as a mask itself, but also as a filter sheet that can be removably attached to a mask body. For example, the sheet for a mask of the present invention can be used as a filter sheet 1F of a mask 1 that includes a mask body 1A and the filter sheet 1F disposed on an inner side of the mask body 1A.

Figure 14:
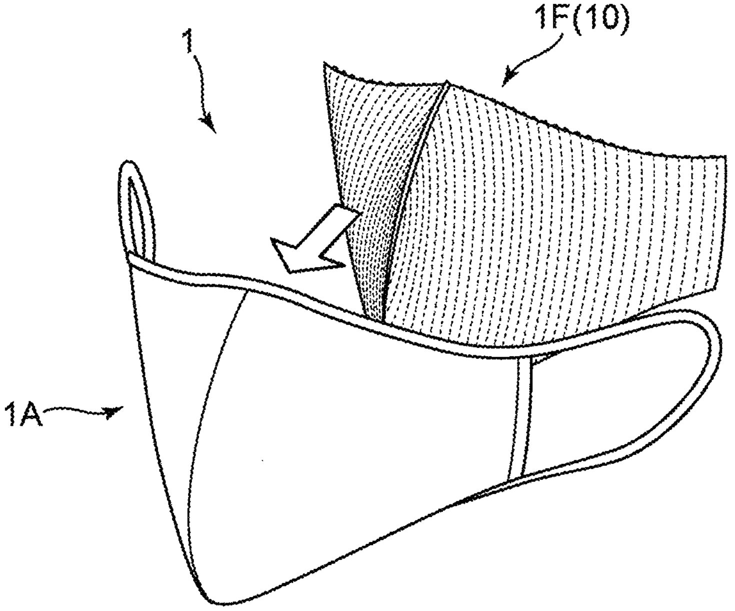
FIG. 14 is a perspective view illustrating of the sheet for a mask as a filter sheet.

It is preferable that, like the mask body 1A shown in FIGS. 12(*a*) and 12(*b*), the filter sheet 1F has a three-dimensional shape. This embodiment is shown in FIG. 14.

For example, in the case where a sheet 10 for a mask in which the second fiber layer 12 has a ridge-groove structure constituted by projections 13 and depressions 14 is used as a filter sheet 1F, in order to achieve a good feel during use, it is preferable that the sheet 10 for a mask is used in such a manner that the projections 13 of the sheet 10 for a mask extend in the vertical direction of the mask 1.

Furthermore, in the case where the sheet 10 for a mask is used as the filter sheet 1F, it is preferable to use the first surface of the sheet 10 for a mask, which is the surface on which the projecting-and-depressed structure is formed, as the skin-facing surface in order to achieve a good feel during use.

Next, another embodiment of the sheet for a mask of the present invention will be described. In this embodiment, differences from the embodiments that have been described above will be mainly described, and descriptions regarding the embodiments that have been described above appropriately apply to those points that will not be described below.

In the sheet 10 for a mask of the present embodiment, it is preferable that a third fiber layer 33 is disposed on the surface of the second fiber layer 12 that is opposite to the surface of the second fiber layer 12 facing the first fiber layer 11. An outer surface of the third fiber layer 33, that is, the surface of the third fiber layer 33 that is opposite to a surface of the third fiber layer 33 facing the second fiber layer 12 serves as the first surface I of the sheet 10 for a mask. In short, the first surface I is located on a side of the third fiber layer 33 that is opposite to the surface of the third fiber layer 33 facing the second fiber layer 12.

It is preferable that, like the second fiber layer 12, the third fiber layer 33 has a projecting-and-depressed shape.

It is preferable that the projecting-and-depressed shape of the third fiber layer 33 is complementary to the projecting-and-depressed shape of the second fiber layer 12, and the third fiber layer 33 has a shape that conforms to the second fiber layer 12. Due to the third fiber layer 33 having such a form, the ventilation resistance R can be reduced, compared with a case where the third fiber layer 33 is flat. Moreover, when the sheet 10 for a mask is used such that the third fiber layer 33 comes into contact with the skin, the third fiber layer 33 having such a form also has the advantage of reducing the contact area between the skin and the third fiber layer 33 and hence reducing the friction between the skin and the third fiber layer 33.

It is preferable that the third fiber layer 33 is in close contact with the second fiber layer 12, with no gap left therebetween.

It is preferable that the third fiber layer 33 and the second fiber layer 12 are bonded together by fiber entanglement or by an adhesive. In order not to degrade the texture of the sheet 10 for a mask, it is preferable that the third fiber layer 33 and the second fiber layer 12 are bonded together by fiber entanglement.

It is preferable that projections of the third fiber layer 33 are located at the same positions as the projections of the second fiber layer 12. Similarly, it is preferable that depressions of the third fiber layer 33 are located at the same positions as the depressions of the second fiber layer 12.

Furthermore, it is preferable that the positions of joined portions 15 of the third fiber layer 33 are the same as the positions of the joined portions 15 of the second fiber layer 12 in a plan view of the sheet 10 for a mask.

Figure 15:
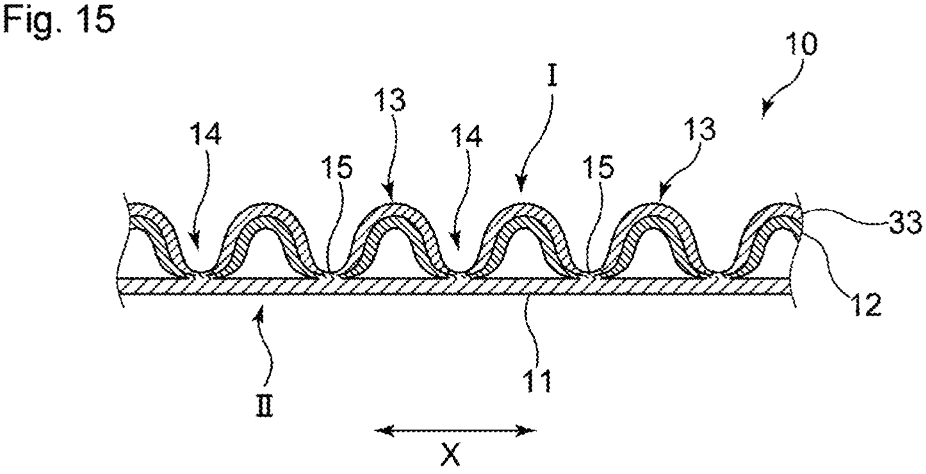
FIG. 15 is a cross-sectional view showing another embodiment of the sheet for a mask of the present invention.

This embodiment is shown in FIG. 15, in which the same members as those shown in FIGS. 2 to 14 are denoted by the same reference numerals.

It is preferable that the second fiber layer 12 has a higher trapping ratio for particles having a particle diameter exceeding 1 μm and/or a smaller average fiber diameter than the third fiber layer 33.

The third fiber layer 33 has the function of protecting the second fiber layer 12. More specifically, as described above, in order to achieve both good particle trapping performance and low ventilation resistance, the second fiber layer 12 preferably has a smaller average fiber diameter of constituent fibers than the third fiber layer 33 and preferably has a lower basis weight than the third fiber layer 33. As a result, the second fiber layer 12 tends to have low strength, which can lead to damage to the second fiber layer 12 during the production process of the sheet 10 for a mask or during use of the sheet 10 for a mask. In order to prevent this problem, the second fiber layer 12 is protected by the third fiber layer 33 by laminating the third fiber layer 33 on the outer surface of the second fiber layer 12. For this purpose, it is desirable that the third fiber layer 33 has higher strength than the second fiber layer 12.

In view of the strength of the third fiber layer 33, the basis weight of the third fiber layer 33 is preferably 5 $g/m^2$ or greater, more preferably 10 $g/m^2$ or greater, and even more preferably 12 $g/m^2$ or greater.

On the other hand, in order to ensure that the sheet 10 for a mask is soft so that, when worn on the face of a person, it can fit without gaps, the basis weight of the third fiber layer 33 is preferably 30 $g/m^2$ or less, more preferably 20 $g/m^2$ or less, and even more preferably 18 $g/m^2$ or less.

In addition, when the third fiber layer 33 is disposed, relatively large particles are trapped in the third fiber layer 33, so that the second fiber layer 12 only needs to trap microparticles, and a consequent increase in the life of the second fiber layer 12 as a filter medium can be expected. The closer the trapping ratio of the third fiber layer 33 is to the trapping ratio of the second fiber layer 12, the more likely the third fiber layer 33 is to reach the end of its life before the second fiber layer 12. That is to say, it is preferable that the trapping ratio of the third fiber layer 33 is lower than the trapping ratio of the second fiber layer 12, and there is a certain difference therebetween. In view of this, it is preferable that the trapping ratio for particles having a particle diameter exceeding 1 μm of the third fiber layer 33 is lower than that of the second fiber layer 12. Specifically, the trapping ratio for particles having a particle diameter exceeding 1 μm of the third fiber layer 33 is preferably 0% or greater and less than 60%, and more preferably less than 50%.

In addition, while protecting the second fiber layer 12 as described above, the third fiber layer 33 must not impair the air permeability of the sheet 10 for a mask. In view of this, it is also preferable that the third fiber layer 33 has lower ventilation resistance than the second fiber layer 12. Specifically, the ventilation resistance of the third fiber layer 33 is preferably greater than 0 kPa·s/m and 0.1 kPa·s/m or less, and more preferably 0.05 kPa·s/m or less.

From the same point of view as above, it is preferable that the average fiber diameter of constituent fibers of the third fiber layer 33 is larger than the average fiber diameter of constituent fibers of the second fiber layer 12. Specifically, the average fiber diameter of constituent fibers of the third fiber layer 33 is preferably 5 μm or greater, more preferably 8 μm or greater, and even more preferably 10 μm or greater, on the condition that it is larger than the average fiber diameter of constituent fibers of the second fiber layer 12.

Also, the average fiber diameter of constituent fibers of the third fiber layer 33 is preferably 30 μm or less, more preferably 25 μm or less, and even more preferably 20 μm or less.

As the third fiber layer 33 that satisfies the above-described various conditions, for example, a spunbonded nonwoven fabric, an air-through nonwoven fabric, a spunlaced nonwoven fabric, a needlepunched nonwoven fabric, or the like can be used.

A method for producing the three-layered sheet 10 for a mask of the present embodiment is basically similar to the method for producing a two-layered sheet for a mask. For example, in the case where the sheet 10 for a mask shown in FIG. 15 is to be produced according to the first production method, a second fiber sheet on which a third fiber sheet, which is a raw fabric for forming the third fiber layer 33, is laminated can be superposed on a first fiber sheet such that the second fiber sheet faces the first fiber sheet. The second fiber sheet is superposed on the first fiber sheet such that the second fiber sheet faces the first fiber sheet. It is preferable that a fiber sheet having a larger average fiber diameter than the second fiber sheet is used as the third fiber sheet.

Both in the case where the first production method is used and in the case where the second production method is used, in order to laminate the third fiber sheet on the second fiber sheet, it is preferable, in terms of productivity, to obtain a second fiber sheet by accumulating spun fibers on one surface of a previously produced third fiber sheet. For example, it is possible to produce a third fiber sheet by accumulating electrospun fibers on one surface of a previously produced spunbonded raw nonwoven fabric that is being conveyed in one direction. In this manner, the third fiber layer 33 and the second fiber layer 12 can be bonded together by fiber entanglement.

For example, in the case where the sheet 10 for a mask shown in FIG. 15 is to be produced according to the second production method, a second fiber sheet on which a third fiber sheet, which is a raw fabric for forming the third fiber layer 33, is laminated can be given a projecting-and-depressed shape together with the third fiber sheet, and then, the laminate of the third fiber sheet and the second fiber sheet can be superposed on and joined to the first fiber sheet such that the second fiber sheet faces the first fiber sheet. In this case as well, it is preferable that a fiber sheet having a larger average fiber diameter than the second fiber sheet is used as the third fiber sheet.

Figure 16:
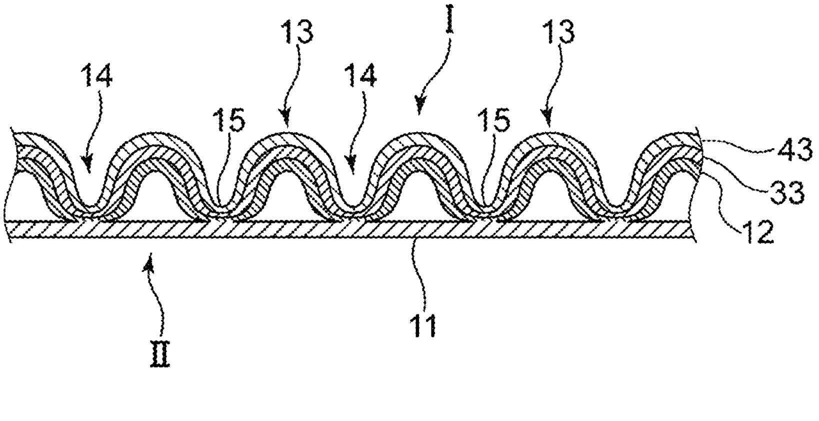
FIG. 16 is a cross-sectional view showing yet another embodiment of the sheet for a mask of the present invention.
Figure 17:
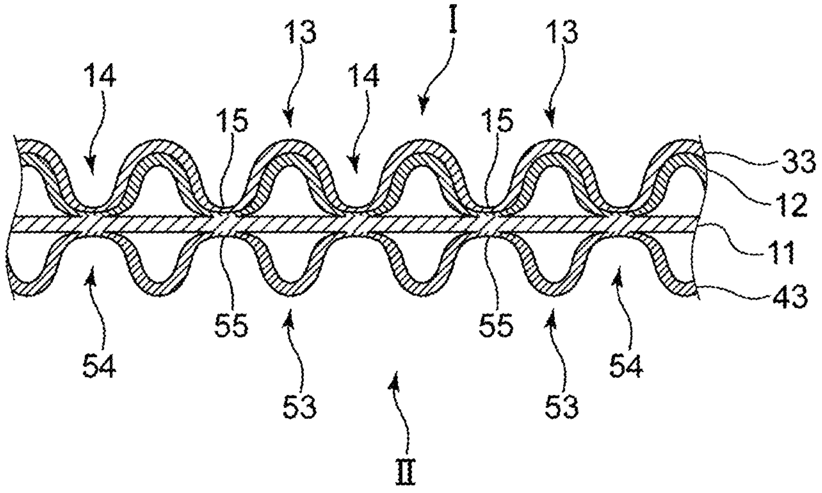
FIG. 17 is a cross-sectional view showing yet another embodiment of the sheet for a mask of the present invention.
Figure 18:
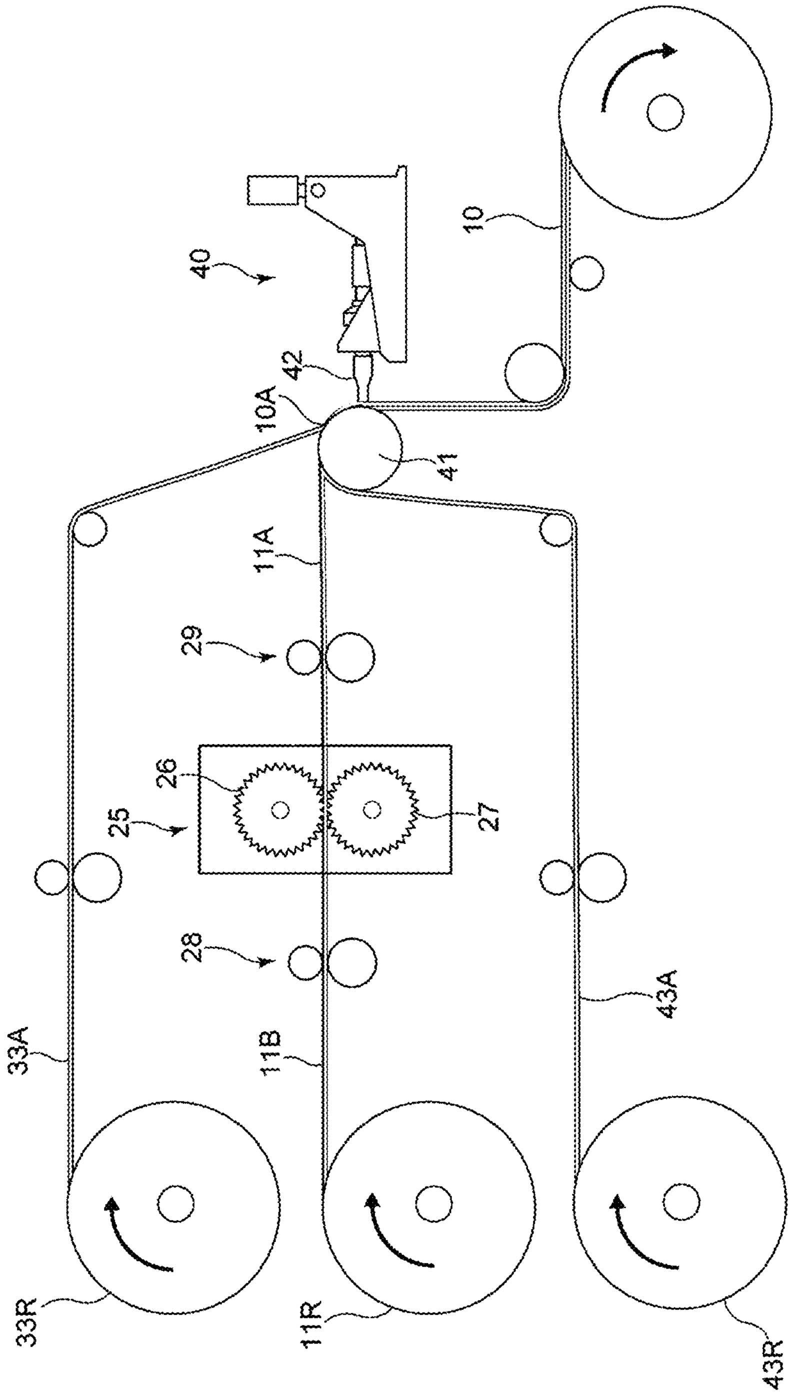
FIG. 18 is a diagram showing yet another example of the apparatus for producing the sheet for a mask.

Next, yet other embodiments of the sheet for a mask of the present invention will be described. In these embodiments, differences from the embodiments that have been described above will be mainly described, and descriptions regarding the embodiments that have been described above appropriately apply to those points that will not be described below. In addition, typical examples of these embodiments are shown in FIGS. 16 to 18, in which the same members as those shown in FIGS. 1 to 15 are denoted by the same reference numerals.

The sheet 10 for a mask of the present invention may also have a configuration in which an additional fiber sheet is laminated on a sheet for a mask having the first, second, and third fiber layers. In one example, a fourth fiber layer 43 is disposed on the surface of the third fiber layer 33 of the sheet 10 for a mask, the surface being opposite to the surface of the third fiber layer 33 facing the second fiber layer 12. An outer surface of the fourth fiber layer 43, that is, the surface opposite to a surface of the fourth fiber layer 43 facing the third fiber layer 33 serves as the first surface I of the sheet 10 for a mask. In short, the first surface I is located on a side of the fourth fiber layer 43 that is opposite to the surface of the fourth fiber layer 43 facing the third fiber layer 33. FIG. 16 shows this example.

It is preferable that, like the second fiber layer 12 and the third fiber layer 33, the fourth fiber layer 43 has a projecting-and-depressed shape.

It is preferable that the projecting-and-depressed shape of the fourth fiber layer 43 is complementary to the projecting-and-depressed shapes of the second fiber layer 12 and the third fiber layer 33, and the fourth fiber layer 43 has a shape that conforms to the third fiber layer 33.

It is preferable that the fourth fiber layer 43 is in close contact with the third fiber layer 33, with no gap left therebetween.

It is preferable that the fourth fiber layer 43 and the third fiber layer 33 are bonded together by fiber entanglement or by an adhesive. In order not to degrade the texture of the sheet 10 for a mask, it is preferable that the fourth fiber layer 43 and the third fiber layer 33 are bonded together by fiber entanglement.

It is preferable that, in a plan view of the sheet 10 for a mask, projections of the fourth fiber layer 43 are located at the same positions as the projections of the second fiber layer 12 and the third fiber layer 33. Similarly, it is preferable that, in a plan view of the sheet 10 for a mask, depressions of the fourth fiber layer 43 are located at the same positions as the depressions of the second fiber layer 12 and the third fiber layer 33.

Furthermore, it is preferable that the positions of joined portions 15 of the fourth fiber layer 43 are the same as the positions of the joined portions 15 of the second fiber layer 12 and the third fiber layer 33 in a plan view of the sheet 10 for a mask.

The fourth fiber layer 43 has the function of imparting appropriate stiffness to the sheet 10 for a mask. Note that, although the third fiber layer 33 of the sheet for a mask of the above-described embodiment shown in FIG. 15 also imparts appropriate stiffness to the sheet for a mask, in the present embodiment, even more appropriate stiffness is imparted to the sheet 10 for a mask by using the fourth fiber layer 43 in addition to the third fiber layer 33. Thus, in a mask that uses the sheet for a mask of the present invention, deformation of the mask caused by stress generated in the sheet when the mask is worn can be even more effectively prevented.

In order to impart appropriate stiffness to the sheet 10 for a mask, the basis weight of the fourth fiber layer 43 is preferably 5 $g/m^2$ or greater, more preferably 10 $g/m^2$ or greater, and even more preferably 12 $g/m^2$ or greater.

Also, the basis weight of the fourth fiber layer 43 is preferably 30 $g/m^2$ or less, more preferably 20 $g/m^2$ or less, and even more preferably 18 $g/m^2$ or less.

In addition, to make the sheet 10 for a mask useful as an air filter medium, the trapping ratio H for particles having a particle diameter exceeding 1 μm of the fourth fiber layer 43 is preferably 0% or greater and less than 60%, and more preferably less than 50%. It is preferable that the trapping ratio H for particles having a particle diameter exceeding 1 μm of the fourth fiber layer 43 is lower than that of the second fiber layer 12. The trapping ratio H of the fourth fiber layer 43 may be higher or lower than the trapping ratio H of the third fiber layer 33 on the condition that the trapping ratios H of these two fiber layers are lower than the trapping ratio H of the second fiber layer 12.

In addition, it is preferable that the fourth fiber layer 43 does not impair air permeability while imparting the function of an air filter medium to the sheet 10 for a mask. In view of this, the ventilation resistance R of the fourth fiber layer 43 is preferably greater than 0 kPa·s/m and 0.1 kPa·s/m or less, and more preferably 0.05 kPa·s/m or less.

From the same point of view as above, the average fiber diameter of constituent fibers of the fourth fiber layer 43 is preferably 5 μm or greater, more preferably 8 μm or greater, and even more preferably 10 μm or greater.

Also, the average fiber diameter of constituent fibers of the fourth fiber layer 43 is preferably 30 μm or less, more preferably 25 μm or less, and even more preferably 20 μm or less. It is preferable that the average fiber diameter of constituent fibers of the fourth fiber layer 43 is larger than the average fiber diameter of constituent fibers of the second fiber layer 12. The average fiber diameter of constituent fibers of the fourth fiber layer 43 may be larger or smaller than that of the third fiber layer 33 on the condition that the average fiber diameters of constituent fibers of these two fiber layers are larger than the average fiber diameter of constituent fibers of the second fiber layer 12.

As the fourth fiber layer 43 that satisfies the above-described various conditions, for example, a spunbonded nonwoven fabric, an air-through nonwoven fabric, a spunlaced nonwoven fabric, a needlepunched nonwoven fabric, or the like can be used.

As with the sheets for a mask of the embodiments shown in FIGS. 3 and 15, the sheet 10 for a mask of the present embodiment is suitably produced using the methods illustrated in FIGS. 10 and 11.

In another example of the configuration in which an additional fiber sheet is laminated on a sheet for a mask having the first, second, and third fiber layers, a fourth fiber layer 43 is disposed the surface of the first fiber layer 11 that is opposite to the surface of the first fiber layer 11 facing the second fiber layer 12. An outer surface of the fourth fiber layer 43, that is, the surface opposite to a surface of the fourth fiber layer 43 facing the first fiber layer 11 serves as the second surface II of the sheet 10 for a mask. In short, the second surface II is located on a side of the fourth fiber layer 43 that is opposite to the surface of the fourth fiber layer 43 facing the first fiber layer 11. FIG. 17 shows this example.

It is preferable that, like the second fiber layer 12 and the third fiber layer 33, the fourth fiber layer 43 has a projecting-and-depressed shape.

The fourth fiber layer 43 has a projecting-and-depressed structure on each surface. More specifically, the fourth fiber layer 43 has a plurality of projections 53 projecting toward the surface of the fourth fiber layer 43 opposite to the surface of the fourth fiber layer 43 facing the first fiber layer 11 and a plurality of depressions 54 that are each arranged between corresponding projections of the plurality of projections 53.

The depressions 54 have joined portions 55 where the first fiber layer 11 and the fourth fiber layer 43 are joined to each other.

It is preferable that, in a plan view of the sheet 10 for a mask, the projections 53 of the fourth fiber layer 43 are located at the same positions as the projections 13 of the second fiber layer 12 and the third fiber layer 33. Similarly, it is preferable that, in a plan view of the sheet 10 for a mask, the depressions 54 of the fourth fiber layer 43 are located at the same positions as the depressions 14 of the second fiber layer 12 and the third fiber layer 33.

Furthermore, it is preferable that the positions of the joined portions 55 of the fourth fiber layer 43 are the same as the positions of the joined portions 15 of the second fiber layer 12 and the third fiber layer 33 in a plan view of the sheet 10 for a mask.

As with the fourth fiber layer 43 used in the sheet for a mask of the embodiment shown in FIG. 16, the fourth fiber layer 43 of the embodiment shown in FIG. 17 has the function of imparting appropriate stiffness to the sheet 10 for a mask. Therefore, as with the sheet for a mask of the embodiment shown in FIG. 16, the sheet 10 for a mask of the embodiment shown in FIG. 17 has appropriate stiffness.

Details of the fourth fiber layer 43 of the sheet 10 for a mask of the present embodiment are similar to those of the fourth fiber layer of the sheet for a mask of the embodiment shown in FIG. 16.

The sheet 10 for a mask of the present embodiment can be suitably produced using a method described below, for example.

A method for producing the sheet 10 for a mask of the present embodiment includes a joining step of partially joining a first fiber sheet 11A, a laminated fiber sheet 33A, which is a raw fabric for forming the second fiber layer 12 and the third fiber layer 33, and a fourth fiber sheet 43A, which is a raw fabric for forming the fourth fiber layer 43, together to obtain a sheet 10 for a mask.

In addition, it is preferable that the method for producing the sheet 10 for a mask of the present embodiment includes a precursor producing step of producing a composite material 11B, which is a precursor of the first fiber sheet 11A serving as a raw fabric for forming the first fiber layer 11, and an elasticity imparting processing step of drawing the composite material 11B to obtain the first fiber sheet 11A that has elasticity, which is the raw fabric for forming the first fiber layer 11. This embodiment is shown in FIG. 18. In FIG. 18, reference numerals 33R and 43R denote rolls on which the laminated fiber sheet 33A and the fourth fiber sheet 43A, respectively, are wound. Note that details of the precursor producing step and the elasticity imparting processing step are similar to those of the production method illustrated in FIG. 10, and therefore will not be repeated here.

Preferably, the first fiber sheet 11A has elasticity. It is preferable that the first fiber sheet 11A is stretched in the conveyance direction and merges with the laminated fiber sheet 33A and the fourth fiber sheet 43A in this stretched state.

It is preferable that a sheet stack 10A in which the first fiber sheet 11A in the stretched state, the laminated fiber sheet 33A, and the fourth fiber sheet 43A are superposed one on top of another is then subjected to joining processing for partially joining the first fiber sheet 11A, the laminated fiber sheet 33A, and the fourth fiber sheet 43A together.

Any apparatus that is capable of partially joining the first fiber sheet 11A, the laminated fiber sheet 33A, and the fourth fiber sheet 43A together can be used for the joining processing. For example, a heat sealing apparatus, an ultrasonic sealing apparatus, a high-frequency sealing apparatus, or the like can be used.

Details of the subsequent operations are similar to those of the production method illustrated in FIG. 10, and therefore will not be repeated here.

After the first fiber sheet 11A, the laminated fiber sheet 33A, and the fourth fiber sheet 43A have been partially joined together, the tension applied to the sheet 10 for a mask in the conveyance direction is released, and the first fiber layer 11 in the stretched state is thus allowed to contract. As a result, portions of the second fiber layer 12 that are each located between adjacent ones of the joined portions 15 protrude in a direction away from the first fiber layer 11. Similarly, portions of the fourth fiber layer 43 that are each located between adjacent ones of the joined portions 55 protrude in a direction away from the first fiber layer 11 (this protruding direction is opposite to the protruding direction of the second fiber layer 12). Thus, a sheet 10 for a mask in which a plurality of hollow projections 13 and 53 such as those shown in FIG. 17 are formed is obtained.

Although the present invention has been described based on preferred embodiments thereof, the present invention is not limited to the foregoing embodiments. For example, in the mask 1 of the embodiment shown in FIGS. 12(*a*) and 12(*b*), both the mask body 1A and the ear hook portions 1B are made of the sheet for a mask of the present invention. Instead, however, a configuration may be adopted in which only the mask body 1A is made of the sheet for a mask of the present invention, and the ear hook portions 1B are made of another material, such as an elastic cord or a nonwoven fabric having elasticity, for example.

The shape of a mask to which the sheet for a mask of the present invention is applied is not limited to the shape shown in FIGS. 12(*a*) and 12(*b*). For example, the sheet for a mask of the present invention may be applied to a mask that has a rectangular shape in a plan view and in which several folds extending in the lateral direction are formed.

In addition, the filter sheet 1F shown in FIG. 14 has a three-dimensional shape, but instead of this, a filter sheet having a flat shape may be adopted.

The projections 13 and the depressions 14 formed in the sheets 10 for a mask of the foregoing embodiments extend continuously in one direction. Instead, however, projections and depressions may be arranged in a scattered manner.

EXAMPLES

Hereinafter, the present invention will be described in further detail based on examples. However, the scope of the present invention is not limited to the examples given below. Unless otherwise specified, "%" means "mass %".

Example 1

In this example, a sheet for a mask was produced according to the method illustrated in FIG. 11.

(1) Preparation of First Fiber Sheet

A spunbonded nonwoven fabric having the basis weight and average fiber diameter shown in Table 1 and made of a polypropylene (hereinafter also referred to as "PP") resin was prepared. This first fiber sheet was used as a first fiber layer.

(2) Preparation of Third Fiber Sheet

A spunbonded nonwoven fabric having the basis weight and average fiber diameter shown in Table 1 and made of a PP resin was prepared. This third fiber sheet was used as a third fiber layer.

(3) Production of Second Fiber Sheet

A second fiber sheet made of a PP resin was produced on one surface of the third fiber sheet through electrospinning. This second fiber sheet was used as a second fiber layer. The second fiber sheet had the basis weight and average fiber diameter shown in Table 1.

(4) Production of Sheet for a Mask

According to the method illustrated in FIG. 11, the second fiber sheet on which the third fiber sheet was laminated was given a projecting-and-depressed shape and then superposed on and joined to the first fiber sheet. Thus, a sheet for a mask constituted by the first fiber layer, the second fiber layer, and the third fiber layer was produced.

Figure 19:
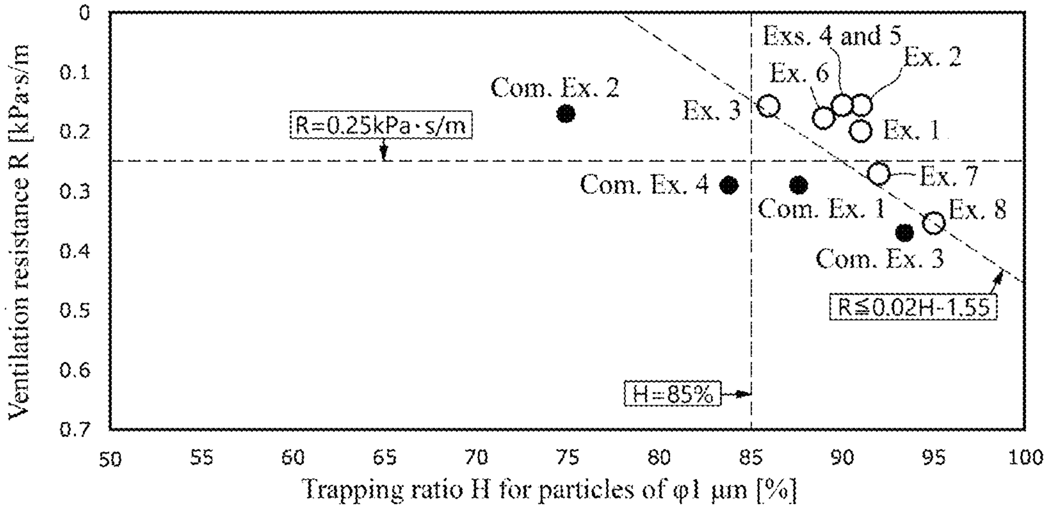
FIG. 19 is a graph showing the relationship between ventilation resistance and particle trapping ratio of sheets, in their entireties, for a mask that were obtained in examples and comparative examples.

Table 1 shows specifications of the obtained sheet for a mask. FIG. 19 shows a graph of the relationship between the ventilation resistance and the trapping ratio of the entire sheet for a mask.

Example 2

A sheet for a mask was produced in the same manner as in Example 1, except that the conditions for imparting a projecting-and-depressed shape to the second fiber sheet on which the third fiber sheet was laminated were changed. Table 1 shows specifications of the obtained sheet for a mask.

Example 3

A sheet for a mask was produced in the same manner as in Example 1, except that a second fiber layer having the basis weight and average fiber diameter shown in Table 1 was used. Table 1 shows specifications of the obtained sheet for a mask.

Example 4

In this example, a sheet for a mask was produced according to the method illustrated in FIGS. 9 and 10.

(15) Production of First Fiber Sheet

Two spunbonded nonwoven fabrics made of a PP resin and having an average fiber diameter of 18 μm and a basis weight of 18 g/m$^2$ were used. A plurality of elastic filaments having a diameter of 100 μm were arranged between the two nonwoven fabrics to produce a composite material 11B shown in FIG. 9. The total basis weight of the elastic filaments was 9 g/m$^2$ with respect to the area of a spunbonded nonwoven fabric. This composite material 11B was passed between a pair of toothed rollers 26 and 27 shown in FIG. 10 to impart elasticity to the composite material 11B. Thus, a first fiber sheet was produced. This first fiber sheet was used as a first fiber layer. The entire first fiber layer had a basis weight of 45 g/m$^2$.

(2) Preparation of Third Fiber Sheet

A spunbonded nonwoven fabric having the basis weight and average fiber diameter shown in Table 1 and made of a PP resin was prepared. This third fiber sheet was used as a third fiber layer.

(3) Production of Second Fiber Sheet

A second fiber sheet made of a PP resin was produced on one surface of the third fiber sheet through electrospinning. This second fiber sheet was used as a second fiber layer. The second fiber sheet had the basis weight and average fiber diameter shown in Table 1.

(4) Production of Sheet for a Mask

According to the method illustrated in FIG. 10, the second fiber sheet on which the third fiber sheet was laminated was superposed on and joined to the first fiber sheet that was in a stretched state. Thus, a sheet for a mask constituted by the first fiber layer, the second fiber layer, and the third fiber layer was produced. In this case, the entire first fiber layer had a basis weight of 45 g/m$^2$.

Table 1 shows specifications of the obtained sheet for a mask.

Examples 5 and 6

A sheet for a mask was produced in the same manner as in Example 4, except that the conditions for imparting a projecting-and-depressed shape to the second fiber sheet on which the third fiber sheet was laminated were changed. Table 1 shows specifications of the obtained sheet for a mask.

Examples 7 and 8

A sheet for a mask was produced in the same manner as in Example 4, except that a second fiber sheet having the basis weight and diameter shown in Table 1 was used. Table 1 shows specifications of the obtained sheet for a mask.

Comparative Example 1

The processing for imparting the projecting-and-depressed shape to the second fiber sheet on which the third fiber sheet was laminated in Example 1 was not performed. Otherwise, the same procedures as in Example 1 were performed. Thus, a sheet for a mask was produced. Table 1 shows specifications of the obtained sheet for a mask.

Comparative Examples 2 to 4

A sheet for a mask was produced in the same manner as in Comparative Example 1, except that a second fiber layer having the basis weight and average fiber diameter shown in Table 1 was used. Table 1 shows specifications of the obtained sheet for a mask.

TABLE 1

| | | Ex. 1 | Ex. 2 | Ex. 3 | Ex. 4 | Ex. 5 | Ex. 6 | Ex. 7 | Ex. 8 | Com. Ex. | Com. Ex. 2 | Com. Ex. 3 | Com. Ex. 4 |
|---|---|---|---|---|---|---|---|---|---|---|---|---|---|
| First fiber layer | Type | Spun-bonded | Spun-bonded | Spun-bonded | Sheet having elasticity | Sheet having elasticity | Sheet having elasticity | Sheet having elasticity | Sheet having elasticity | Spun-bonded | Spun-bonded | Spun-bonded | Spun-bonded |
| | Average fiber diameter D1 (μm) | 15 | 15 | 15 | 18 | 18 | 18 | 18 | 18 | 15 | 15 | 15 | 15 |
| | Basis weight M1 (g/m$^2$) | 18 | 18 | 18 | 18/9/18 | 18/9/18 | 18/9/18 | 18/9/18 | 18/9/18 | 18 | 18 | 18 | 18 |
| | Trapping ratio C1 (%) | 30 | 30 | 30 | 15 | 15 | 15 | 15 | 15 | 30 | 30 | 30 | 30 |

TABLE 1-continued

| | | Ex. 1 | Ex. 2 | Ex. 3 | Ex. 4 | Ex. 5 | Ex. 6 | Ex. 7 | Ex. 8 | Com. Ex. | Com. Ex. 2 | Com. Ex. 3 | Com. Ex. 4 |
|---|---|---|---|---|---|---|---|---|---|---|---|---|---|
| | Number of raised fibers (fibers/cm) | 0 | 0 | 0 | 17.3 | 18.3 | 18.3 | 17.3 | 17.3 | 0 | 0 | 0 | 0 |
| Second fiber layer | Type | | | | | | Electrospun | | | | | | |
| | Average fiber diameter D2 (μm) | 0.5 | 0.5 | 0.5 | 0.5 | 0.5 | 0.5 | 0.5 | 0.5 | 0.5 | 0.5 | 0.9 | 0.9 |
| | Basis weight M2 (g/m²) | 3 | 3 | 2.5 | 3 | 3 | 3 | 4 | 5 | 3 | 2 | 15 | 10 |
| | Trapping ratio C2 (%) | 82 | 82 | 71 | 83 | 83 | 82 | 87 | 92 | 76 | 49 | 86 | 67 |
| Third fiber layer | Type | | | | | | Spunbonded | | | | | | |
| | Average fiber diameter D3 (μm) | | | | | | 15 | | | | | | |
| | Basis weight (g/m²) | | | | | | 18 | | | | | | |
| | Trapping ratio C3 (%) | | | | | | 30 | | | | | | |
| | Number of raised fibers (fibers/cm) | | | | | | 0 | | | | | | |
| D1/D2 | | 30.0 | 30.0 | 30.0 | 36.0 | 36.0 | 36.0 | 36.0 | 36.0 | 30.0 | 30.0 | 16.7 | 16.7 |
| Surface area per unit area S1/S0 (m²/m²) | | 1.5 | 2.0 | 1.5 | 1.7 | 2.1 | 2.5 | 1.7 | 1.7 | 1.0 | 1.0 | 1.0 | 1.0 |
| Projecting-and-depressed shape | | Ridge-groove | Ridge-groove | Ridge-groove | Ridge-groove | Ridge-groove | Ridge-groove | Ridge-groove | Ridge-groove | N/A | N/A | N/A | N/a |
| Height difference between projection and depression (mm) | | 2.0 | 3.0 | 2.0 | 2.0 | 2.0 | 2.0 | 2.0 | 2.0 | 0 | 0 | 0 | 0 |
| Center-to-center distance between adjacent projections (mm) | | 4.0 | 4.0 | 4.0 | 3.0 | 2.5 | 2.0 | 3.0 | 3.0 | 0 | 0 | 0 | 0 |
| Trapping ratio for particles of particle diameter exceeding 1 μm of entire sheet for a mask (%) | | 91 | 91 | 86 | 90 | 90 | 89 | 92 | 95 | 88 | 75 | 93 | 84 |
| Ventilation resistance of entire sheet for a mask (kPa · s/m) | | 0.20 | 0.16 | 0.16 | 0.16 | 0.16 | 0.18 | 0.27 | 0.35 | 0.29 | 0.17 | 0.37 | 0.29 |

As is clear from the results shown in Table 1 and FIG. 19, it can be seen that the sheets for a mask obtained in the examples had higher particle trapping ratios than the sheets of the comparative examples and had ventilation resistances as low as those of the sheets of the comparative examples.

INDUSTRIAL APPLICABILITY

The sheet for a mask of the present invention achieves both high particle trapping performance and low ventilation resistance.

The invention claimed is:

1. A mask comprising:

a mask body that includes a sheet, the sheet including:

a first fiber layer; and a second fiber layer on one surface side of the first fiber layer, wherein the second fiber layer has:

a higher trapping ratio for particles having a particle diameter exceeding 1 μm compared to the first fiber layer, and a smaller average fiber diameter compared to the first fiber layer, a basis weight of the second fiber layer is from 1 to 20 g/m², in a natural state, the second fiber layer has:

a plurality of projections projecting away from the first fiber layer; and a plurality of depressions that are each arranged between corresponding projections of the plurality of projections; and a ratio of a surface area of the second fiber layer per unit area in a planar projection view is greater than 1.0 and 3.0 or less, the plurality of depressions have joined portions where the first fiber layer and the second fiber layer are joined to each other, a ratio of a basis weight of the first fiber layer to the basis weight of the second fiber layer is greater than 0 and 20 or less, and the first fiber layer has a lower ventilation resistance than the second fiber layer, a ratio of the trapping ratio for the first fiber layer to the trapping ratio for the second fiber layer is from 0 to 0.7, the trapping ratio for particles having the particle diameter greater than 1 μm of an entirety of the sheet for the mask is from 85% to 100%, a ventilation resistance of an entirety of the sheet is greater than 0 kPa·s/m and 0.25 kPa·s/m or less, and the trapping ratio and the ventilation resistance of the entirety of the sheet satisfy a formula (1) below:

$$R \leq 0.02H - 1.55 \quad (1),$$

where R is the ventilation resistance and His the trapping ratio.

2. The mask according to claim 1, wherein a third fiber layer is on a second surface of the second fiber layer that is opposite to the first surface of the second fiber layer facing the first fiber layer.

3. The mask according to claim 2, wherein the third fiber layer has a projecting-and-depressed shape that conforms to the second fiber layer.

4. The mask according to claim 2, wherein a fourth fiber layer is on a third surface of the third fiber layer that is opposite to a fourth surface of the third fiber layer facing the second fiber layer, or wherein the fourth fiber layer is on a fifth surface of the first fiber layer that is opposite to a sixth surface of the first fiber layer facing the second fiber layer.

5. The mask according to claim 1, wherein the average fiber diameter of the second fiber layer is 0.2 μm or greater and 3 μm or less.

6. The mask according to claim 1, wherein the basis weight of the first fiber layer is 5 $g/m^2$ or greater and 55 $g/m^2$ or less.

7. The mask according to claim 1, wherein the trapping ratio of the first fiber layer is 15%-30%, and the trapping ratio of the second fiber layer is 70%-100%.

* * * * *